US011732860B2

(12) United States Patent
Kurashige et al.

(10) Patent No.: US 11,732,860 B2
(45) Date of Patent: Aug. 22, 2023

(54) ILLUMINATION DEVICE

(71) Applicant: Dai Nippon Printing Co., Ltd., Tokyo (JP)

(72) Inventors: Makio Kurashige, Tokyo (JP); Shumpei Nishio, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 728 days.

(21) Appl. No.: 16/605,942

(22) PCT Filed: Apr. 25, 2018

(86) PCT No.: PCT/JP2018/016794
§ 371 (c)(1),
(2) Date: Oct. 17, 2019

(87) PCT Pub. No.: WO2018/199163
PCT Pub. Date: Nov. 1, 2018

(65) Prior Publication Data
US 2020/0318805 A1  Oct. 8, 2020

(30) Foreign Application Priority Data
Apr. 27, 2017  (JP) ................... 2017-088893

(51) Int. Cl.
*F21S 41/675*   (2018.01)
*F21V 14/06*   (2006.01)
(Continued)

(52) U.S. Cl.
CPC ............ *F21S 41/675* (2018.01); *F21V 14/06* (2013.01); *G02B 26/0875* (2013.01); *G02B 26/105* (2013.01); *G02B 27/425* (2013.01)

(58) Field of Classification Search
CPC .. G02B 26/105; G02B 27/0944; G02B 26/10; G02B 27/48; G02B 5/32; G02B 26/08;
(Continued)

(56) References Cited

U.S. PATENT DOCUMENTS 9,829,858 B2  11/2017  Christmas et al.
2007/0147065 A1  6/2007  Nagata
(Continued)

FOREIGN PATENT DOCUMENTS

CN  104736388 A  6/2015
CN  106500037 A  3/2017
(Continued)

OTHER PUBLICATIONS

Yingming Liu et al., "Large Size MEMS Scanning Mirror with Vertical Comb Drive for Tunable Optical Filter," *Optics and Lasers in Engineering*, vol. 51, No. 1, Jan. 1, 2013, pp. 54-60.
(Continued)

*Primary Examiner* — William J Carter
(74) *Attorney, Agent, or Firm* — Burr Patent Law, PLLC

(57) ABSTRACT

With a simple configuration, a clear illumination area with suppressed blurring is formed, and a form such as position, shape, and size thereof is changed. Divergent light from a point light source is shaped by a collimating optical system and emitted to a hologram element. Since the point light source is arranged at a front focal position of the collimating optical system, the light emitted from the collimating optical system is emitted to the hologram element as parallel light, and diffracted light therefrom forms an illumination area at a predetermined position on an illumination target surface. A light scanning part rotating about a predetermined rotation axis is arranged between the point light source and the collimating optical system, and light incident on the collimating optical system is scanned. By this scanning, an
(Continued)

(a)

(b)

(c)

incident angle of the parallel light incident on the hologram element changes, and the illumination area changes.

23 Claims, 15 Drawing Sheets

(51) Int. Cl.
*G02B 26/08* (2006.01)
*G02B 26/10* (2006.01)
*G02B 27/42* (2006.01)

(58) Field of Classification Search
CPC ........ G02B 27/42; F21S 41/16; F21S 41/675; F21V 14/06
See application file for complete search history.

(56) References Cited

U.S. PATENT DOCUMENTS

| | | |
|---|---|---|
| 2008/0225361 A1 | 9/2008 | Kasazumi et al. |
| 2012/0044553 A1* | 2/2012 | Kurashige ............ H04N 9/3161 359/15 |
| 2013/0258689 A1* | 10/2013 | Takahira ............... F21S 41/151 362/465 |
| 2015/0285457 A1 | 10/2015 | Erdl et al. |
| 2016/0085068 A1 | 3/2016 | Abelé et al. |
| 2017/0068168 A1 | 3/2017 | Zeitner et al. |
| 2017/0334341 A1 | 11/2017 | Kurashige et al. |
| 2018/0051857 A1 | 2/2018 | Yamada et al. |

FOREIGN PATENT DOCUMENTS

| | | |
|---|---|---|
| EP | 2 128 521 A1 | 12/2009 |
| JP | 2009-224039 A1 | 10/2009 |
| JP | 2012-123382 A1 | 6/2012 |
| JP | 2015-132707 A1 | 7/2015 |
| WO | 2005/073798 A1 | 8/2005 |
| WO | 2016/072505 A1 | 5/2016 |
| WO | 2016/204139 A1 | 12/2016 |

OTHER PUBLICATIONS

Zhen Jiang et al., "Minimization of Geometric-Beam Broadening in a Grating-Based Time-Domain Delay Line for Optical Coherence Tomography Application," *Journal of the Optical Society of America*, vol. 24, No. 12, Dec. 1, 2007, pp. 3808-3818.
Extended European Search Report (Application No. 18791233.2) dated Jul. 14, 2020.
International Search Report and Written Opinion (Application No. PCT/JP2018/016794) dated Jul. 17, 2018.
English translation of International Preliminary Report on Patentability (Chapter I) (Application No. PCT/JP2018/016794) dated Nov. 7, 2019, 8 pages.
Chinese Office Action (Application No. 201880026326.8) dated Feb. 7, 2022 (with English translation).
Japanese Office Action (Application No. 2019-514575) dated Nov. 26, 2021 (with English translation).
Chinese Office Action (Application No. 201880026326.8) dated Apr. 20, 2020 (with English translation).
Chinese Office Action (Application No. 201880026326.8) dated Aug. 10, 2021 (with English translation).
Extended European Search Report dated Oct. 17, 2022 (Application No. 18 791 233.2).

* cited by examiner (a)

(b)

(a)

(b)

(c)

ILLUMINATION DEVICE

TECHNICAL FIELD

The present invention relates to an illumination device for illuminating a specific area, and particularly to an illumination device capable of changing a position, shape, and area of an illumination area in a plurality of ways.

BACKGROUND ART

In the related art, there has been proposed an illumination device that illuminates a specific area by using diffracted light obtained from a diffractive optical element as illumination light. For example, Patent Literature 1 below discloses an illumination device that performs illumination by diffracting light emitted from a coherent light source with a volume hologram.

In addition, recently, there has been proposed an illumination device which is mounted on a vehicle such as an automobile and irradiates a road surface with illumination light from a coherent light source. For example, Patent Literature 2 discloses a vehicle-mounted illumination device that irradiates a transmission hologram element with laser light emitted from a laser light source to form a desired illumination pattern on a road surface. This illumination device can illuminate a desired position on a road surface while employing a simple optical system that diffracts laser light generated by a single light source with a single hologram element.

Since a desired diffraction pattern (interference fringe pattern) can be recorded in advance in a diffractive optical element such as a hologram element, an illumination pattern having a desired shape can be formed on the road surface. When light is made incident on the diffractive optical element from a predetermined direction, diffracted light is emitted in the direction according to the recorded diffraction pattern, and a predetermined position on the illumination target surface can be illuminated in an illumination pattern with the emitted diffracted light.

CITATION LIST

Patent Literature

Patent Literature 1: International Publication No. WO/2005/073798
Patent Literature 2: JP 2015-132707 A

SUMMARY OF INVENTION

Technical Problem

An illumination device assuming a specific application is desired to have a function (function to illuminate a plurality of illumination ranges) that changes the form such as position, shape, area (size) of the formed illumination area in a plurality of ways. For example, as exemplarily described in the above-mentioned Patent Literature 2, in the case of an illumination device mounted on a vehicle such as an automobile and used for illuminating a predetermined position on a traveling road surface, if form such as a position, shape, and area of the illumination area formed on the road surface can be changed variously, it is possible to provide a driver or a pedestrian with a wide variety of information.

However, when a function of changing the form of presentation of the illumination area in a general way is added to the above-described conventional illumination device, a problem occurs that the structure of the device is complicated. For example, as a general method of changing the position, shape, and area of the illumination area, a method of recording a plurality of diffraction patterns in advance in a diffractive optical element can be adopted. However, if such a method is adopted, the design of the diffractive optical element becomes difficult, and light needs to be incident from a direction determined for each individual diffraction pattern, so the configuration of the optical system of the illumination device is also It may be complicated.

In addition, although an illumination area having an arbitrary shape such as characters and figures can be formed according to the diffraction pattern recorded in the diffractive optical element, when the form of presentation of the illumination area is changed, blurring may occur in a contour of the illumination area. In general, if a highly coherent light source such as a laser light source is used, in principle, any illumination pattern such as characters and figures can be clearly displayed. However, when the form of presentation of the illumination area is changed, blurring of the outline of the illumination area cannot be ignored even when a coherent light source is used.

In particular, in order to form an illumination area configured by characters and figures on the road surface in front of the vehicle and to allow the driver of the vehicle to recognize the illumination area, it is necessary to project the illumination area to a considerably distant position in front of the vehicle. As a result, the angle between the optical axis of the illumination light and the illumination target surface (road surface) is considerably reduced, and thus the pattern of characters or figures forming the illumination area tends to be unclear. For example, in the case of the illumination device described in Patent Literature 2 described above, the laser beam generated by a single laser light source is diffracted by a single hologram element to perform illumination. Thus, the illumination area formed on the road surface is blurred due to the beam diameter of the laser light emitted from the laser light source or the like, and when viewed from the observer, the pattern of characters and figures formed on the road surface appears to be blurred.

Therefore, an object of the invention is to provide an illumination device capable of forming a clear illumination area with suppressed blurring on a predetermined illumination target surface with a simple configuration and further changing a form such as a position, shape, and area of the illumination area.

Solution to Problem (1) According to a first aspect of the invention, an illumination device includes:
a point light source generation part which generates a point light source;
a diffractive optical element which forms a predetermined illumination area on a predetermined illumination target surface by diffracted light generated by diffracting parallel light incident at a predetermined incident angle;
a collimating optical system which shapes divergent light from the point light source into parallel light; and
a light scanning part which scans light by emitting the incident light while changing a direction of the light, in which the point light source, the light scanning part, the collimating optical system, and the diffractive optical element are arranged such that the divergent light from the point light source is incident on the diffractive optical element from one of the light scanning part and the collimating optical system through another, the collimating optical system is arranged such that a front focal position of the collimating optical system coincides with a position of the point light source, and the incident angle of the parallel light incident on the diffractive optical element is changed by scanning of the light scanning part.

(2) According to a second aspect of the invention, in the illumination device according to the first aspect described above, the divergent light from the point light source is given to the collimating optical system through the light scanning part, and the parallel light shaped by the collimating optical system is incident on the diffractive optical element, and the direction of the light incident on the collimating optical system is changed by the scanning of the light scanning part, and the incident angle of the parallel light incident on the diffractive optical element is changed.

(3) According to a third aspect of the invention, in the illumination device according to the second aspect described above, the light scanning part includes a transmission type scanning body which emits light incident on a first surface from a second surface and a scanning mechanism which performs scanning while rotating the transmission type scanning body about at least one axis, and the divergent light from the point light source is transmitted through the transmission type scanning body to be directed to the collimating optical system, and a direction of the light transmitted through the transmission type scanning body is changed in at least one direction by the scanning of the scanning mechanism.

(4) According to a fourth aspect of the invention, in the illumination device according to the second aspect described above, the light scanning part includes a reflection type scanning body having a reflection surface which reflects and emits incident light and a scanning mechanism which performs scanning while rotating the reflection type scanning body about at least one axis, and the divergent light from the point light source is reflected by the reflection type scanning body to be directed to the collimating optical system, and a direction of the light reflected by the reflection type scanning body is changed in at least one direction by the scanning of the scanning mechanism.

(5) According to a fifth aspect of the invention, in the illumination device according to the first aspect described above, the divergent light from the point light source is given to the light scanning part through the collimating optical system, and the parallel light shaped by the collimating optical system is incident on the light scanning part, and the incident angle of parallel light incident on the diffractive optical element is changed by the scanning of the light scanning part.

(6) According to a sixth aspect of the invention, in the illumination device according to the fifth aspect described above, the light scanning part includes a transmission type scanning body which emits light incident on a first surface from a second surface and a scanning mechanism which performs scanning while rotating the transmission type scanning body about at least one axis, and the parallel light from the collimating optical system is transmitted through the transmission type scanning body to be directed to the diffractive optical element, and a direction of the parallel light transmitted through the transmission type scanning body is changed in at least one direction by the scanning of the scanning mechanism.

(7) According to a seventh aspect of the invention, in the illumination device according to the fifth aspect described above, a light scanning part includes a reflection type scanning body having a reflection surface which reflects and emits incident light and a scanning mechanism which performs scanning while rotating the reflection type scanning body about at least one axis, and the parallel light from the collimating optical system is reflected by the reflection type scanning body to be directed to the diffractive optical element, and a direction of the parallel light reflected by the reflection type scanning body is changed in at least one direction by the scanning of the scanning mechanism.

(8) According to an eighth aspect of the invention, in the illumination device according to any one of the first to seventh aspects described above, the light scanning part performs periodic scanning in at least one direction, and the incident angle of the parallel light incident on the diffractive optical element changes periodically.

(9) According to a ninth aspect of the invention, in the illumination device according to any one of the first to eighth aspects described above, the diffractive optical element is formed with a diffraction pattern of which a diffraction direction changes according to the change of the incident angle of the parallel light.

(10) According to a tenth aspect of the invention, in the illumination device according to any one of the first to eighth aspects described above, the diffractive optical element is formed with a diffraction pattern in which at least one of a position, shape, and area of the illumination area formed on the predetermined illumination target surface changes according to the change of the incident angle of the parallel light.

(11) According to an eleventh aspect of the invention, in the illumination device according to any one of the first to eighth aspects described above, the diffractive optical element is configured by a hologram element which forms a reproduced image on the predetermined illumination target surface by the diffracted light, and the illumination area is formed by the reproduced image.

(12) According to a twelfth aspect of the invention, in the illumination device according to the eleventh aspect described above, an interference fringe of object light from a diffusion plate of a predetermined shape and parallel reference light is recorded in the hologram element, and when the light scanning part scans the parallel light incident on the hologram element, scanning is performed to increase or decrease a reference angle with an incident angle of the parallel reference light as the reference angle.

(13) According to a thirteenth aspect of the invention, in the illumination device according to the twelfth aspect described above, the hologram element is configured by a CGH in which the interference fringe obtained by computer calculation is recorded.

(14) According to a fourteenth aspect of the invention, in the illumination device according to the twelfth or thirteenth aspect described above, the diffractive optical element includes a plurality of element diffractive optical parts, and each of the element diffractive optical parts forms the same illumination area on the illumination target surface on the basis of parallel incident light incident at a common reference angle.

(15) According to a fifteenth aspect of the invention, in the illumination device according to the fourteenth aspect described above, the diffractive optical element includes the plurality of element diffractive optical parts arranged in a two-dimensional matrix on a predetermined arrangement plane.

(16) According to a sixteenth aspect of the invention, in the illumination device according to the first to fifteenth aspects described above, the light scanning part has a function of two-dimensionally scanning light by emitting the light while changing a direction of the incident light with respect to two orthogonal directions, and a position of an illumination area formed on the illumination target surface is changed two-dimensionally.

(17) According to a seventeenth aspect of the invention, in the illumination device according to any one of the first to sixteenth aspects described above, when an aggregate area of a plurality of different illumination areas formed on the illumination target surface is called an illumination zone, the light scanning part performs scanning at a speed where the illumination zone is visually recognized as a single area by a human eye.

(18) According to an eighteenth aspect of the invention, the illumination device according to any one of the first to seventeenth aspects described above further includes:

a scanning control part which controls the scanning of the light scanning part; and a light source control part which controls the turning on-or-off of the point light source generation part, in which the turning on-or-off of the point light source is controlled by the light source control part in conjunction with the scan control by the scanning control part.

(19) According to a nineteenth aspect of the invention, in the illumination device according to the eighteenth aspect described above, the scanning control part performs scan control such that scanning is performed periodically, and the light source control part performs control of turning on at a specific scanning position and turning off at other scanning positions so as to illuminate only the illumination area corresponding to the specific scanning position.

(20) According to a twentieth aspect of the invention, in the illumination device according to any one of the first to nineteenth aspects described above, the point light source generation part includes a laser light source and an optical fiber which guides laser light generated by the laser light source from a root end to a tip end, and the point light source is generated at the tip end of the optical fiber.

(21) According to a twenty-first aspect of the invention, in the illumination device according to any one of the first to nineteenth aspects described above, the point light source generation part includes a light source device and a condensing lens which condenses light from the light source device, and the point light source is generated at a condensing position of the condensing lens.

(22) According to a twenty-second aspect of the invention, in the illumination device according to any one of the first to nineteenth aspects described above, the point light source generation part includes a laser light source and a diverging lens which diverges laser light generated by the laser light source, and the point light source is generated at a position of the diverging lens.

(23) According to a twenty-third aspect of the invention, a color illumination device includes three sets of illumination devices according to any one of the first to twenty-second aspects described above, in which a point light source generation part of a first illumination device generates a red point light source, a point light source generation part of a second illumination device generates a green point light source, and a point light source generation part of a third illumination device generates a blue point light source, a diffractive optical element of the first illumination device forms a red illumination area, a diffractive optical element of the second illumination device forms a green illumination area, and a diffractive optical element of the third illumination device forms a blue illumination area, and a color illumination area of a predetermined color is formed in an overlapping portion of the red illumination area, the green illumination area, and the blue illumination area.

(24) According to a twenty-fourth aspect of the invention, the illumination device according to the first to twenty-third aspects described above further includes an attaching part for attachment to a vehicle, in which the illumination target surface is set on a road surface, and the road surface is illuminated from the vehicle.

(25) According to a twenty-fifth aspect of the invention, an illumination device includes:

a point light source generation part which generates a point light source;

a light scanning part which scans divergent light in at least one direction by changing a direction of the divergent light from the point light source; and a collimating optical system which shapes the light scanned by the light scanning part into parallel light, in which the collimating optical system is arranged such that a front focal position of the collimating optical system coincides with a position of the point light source, and the illumination device is capable of illuminating in different directions by scanning of the light scanning part.

(26) According to a twenty-sixth aspect of the invention, an illumination device includes:

a point light source generation part which generates a point light source;

a collimating optical system which shapes divergent light from the point light source into parallel light; and a light scanning part which scans the parallel light in at least one direction by changing a direction of the parallel light, in which the collimating optical system is arranged such that a front focal position of the collimating optical system coincides with a position of the point light source, and the illumination device is capable of illuminating in different directions by scanning of the light scanning part.

Advantageous Effects of Invention

In the illumination device according to the invention, the divergent light from the point light source is shaped into the parallel light by the collimating optical system, the parallel light is made incident on the diffractive optical element to obtain diffused light, and the illumination area is formed by the diffused light. Thus, a clear illumination area with suppressed blurring can be formed at a predetermined position. In addition, since the incident angle of the parallel light to the diffractive optical element is changed by the scanning by the light scanning part, it is possible to change the form such as the position, shape, and area of the illumination area with a simple configuration.

Thus, according to the invention, the illumination device can be provided which is capable of forming a clear illumination area with suppressed blurring at a predetermined position with a simple configuration and further changing the form such as the position, shape, and area of the illumination area.

DESCRIPTION OF EMBODIMENTS

Figure 1:
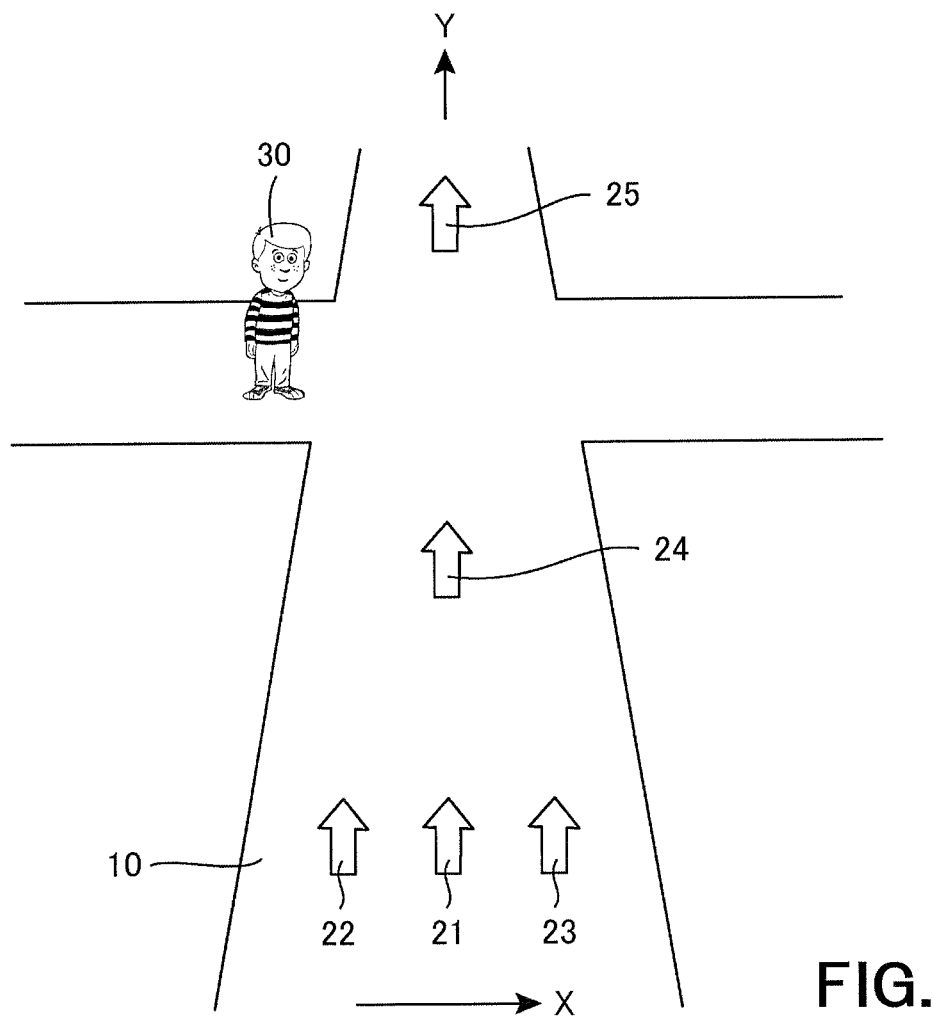
FIG. 1 is an overhead view from a driver's seat illustrating an example in which illumination areas 21 to 25 are formed at various positions on a road surface 10 by illumination from a vehicle-mounted illumination device.

Hereinafter, the invention will be described on the basis of the illustrated embodiments. In the drawings of this application, for the sake of convenience of explanation, the scale of individual components, the dimensional ratio of longitudinal and lateral dimensions, and the like are slightly changed from those of the actual members and are exaggerated as necessary. In addition, the shapes and geometric conditions of the individual components described in this specification, terms such as "parallel", "orthogonal", "identical", and "coincidence" used to specify the shapes and geometric conditions, and values such as a length and an angle should be interpreted within the scope that can expect the same function without being bound by the literal meaning.

§ 1. Features of Vehicle-Mounted Illumination Device

The illumination device according to the invention is a device suitable for illuminating a specific area on an illumination target surface and particularly suitable for application to a vehicle-mounted illumination device that forms an illumination area having a desired shape at a desired position on a road surface. In such application, the angle between the optical axis of illumination light and the illumination target surface is very small, so the illumination pattern presented as the illumination area tends to be unclear. In the illumination device according to the invention, a clear illumination pattern can be formed on the illumination target surface even in such applications. Therefore, in § 1, the features of the vehicle-mounted illumination device for forming a desired illumination pattern on a road surface will be briefly described as a typical application example of the invention.

FIG. 1 is an overhead view from a driver's seat illustrating an example in which illumination areas 21 to 25 are formed on a road surface 10 as an illumination target surface by illumination using a vehicle-mounted illumination device according to the invention. In this drawing, a state is illustrated in which the road surface 10 in front of a vehicle (automobile) is viewed from the driver while driving, and a pedestrian 30 stands on the left side in front of the road surface. Here, for convenience of explanation, an X axis is defined in a right direction of the drawing, and a Y axis is defined in a depth direction of the drawing (a traveling direction of the vehicle). Although not illustrated in FIG. 1, a Z axis is defined in a direction (vertical direction) orthogonal to the road surface 10.

In the drawing, for convenience, a state is illustrated in which five illumination areas 21 to 25 are formed on the road surface 10. However, in practice, these illumination areas 21 to 25 are formed at different points in time. For example, the illumination area 21 is formed at time t1, the illumination area 22 is formed at time t2, and the illumination area 23 is formed at time t3.

Each of the illumination areas 21 to 25 illustrated in FIG. 1 is configured by a graphic pattern in the shape of an arrow and can be used as an indicator on the road surface to present some information to the driver or the pedestrian 30. Of course, the shape of the illumination area is not limited to the arrow-shaped graphic pattern but also can be an arbitrary graphic pattern or an arbitrary character pattern.

The feature of the illumination device according to the invention is that such an illumination area can be formed at a predetermined position on the illumination target surface, and moreover, the formation position of the illumination area can be changed. For example, in the case of the illustrated example, the illumination area 21 is formed at the central position in front of the road surface 10 at time t1. However, at time t2, the position can be moved to the left to form the illumination area 22, and at time t3, the position can be moved to the right to form the illumination area 23.

In this manner, if an operation of sequentially forming the illumination areas 21, 22, and 23 is periodically repeated, a state where the arrow-shaped graphic pattern moves laterally on the road surface 10 can be presented to the driver. Of course, if the operation of forming the illumination areas 21, 24, and 25 in order is repeated, it is possible to present the state where the arrow-shaped graphic pattern moves in the front-rear direction.

Generally in the nighttime, the illumination area formed on the road surface 10 is easy to recognize, but in the daytime, it is necessary to secure sufficient illumination intensity so that the illumination area is displayed with a somewhat high luminance. As described later, when a coherent light source that emits coherent light such as laser light is used in the illumination device according to the invention, it is possible to secure a sufficient illumination intensity.

Incidentally, coherent light such as laser light has larger radiation intensity than general light, so that the eyes of the observer may be damaged. For example, in the case of the example illustrated in FIG. 1, even when the pedestrian 30 or the driver of the oncoming vehicle looks directly at the illumination light from the illumination device, it is necessary to take care that there is no risk of damaging the eyes. In the case of the illumination device according to the invention, as described later, a configuration is adapted in which the divergent light from the point light source is shaped by a collimating optical system and incident on a diffractive optical element. Thus, even when laser light is used to generate a point light source, the beam diameter is enlarged, so that the light intensity per unit area of the illumination light is weakened to a sufficiently safe level. For this reason, even if the pedestrian 30 or the driver of the oncoming vehicle or the like directly looks at the light source side of the illumination device, strong coherent light does not enter the human eye, and there is no risk of damaging the human eye.

Further, in the vehicle-mounted illumination device, the angle between the optical axis of the illumination light and the illumination target surface (the road surface 10 in in the illustrated example) is extremely small, so the illumination pattern formed as the illumination area tends to be unclear. The illumination device according to the invention also has a function to cope with such a problem.

Figure 2:
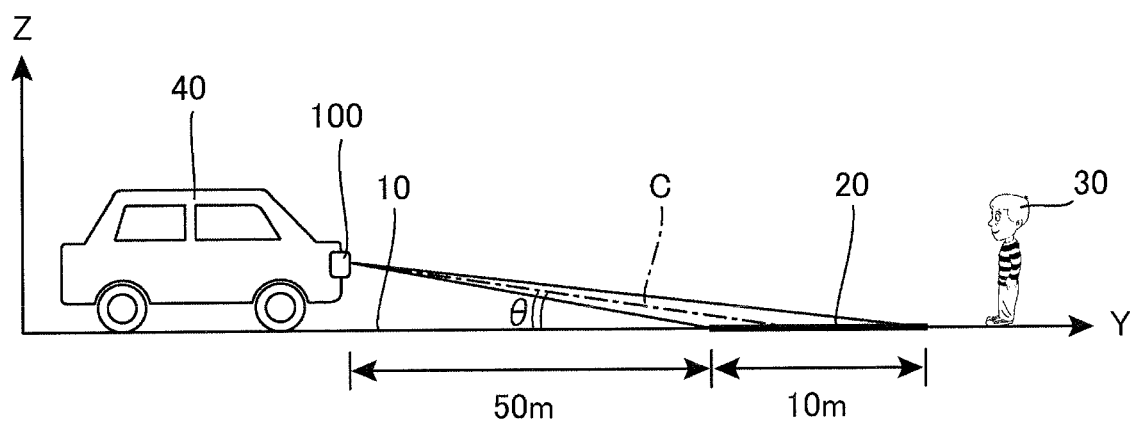
FIG. 2 is a side view illustrating an example in which an illumination area 20 is formed on a road surface 10 by illumination from a vehicle-mounted illumination device 100.

FIG. 2 is a side view illustrating an example in which the illumination area 20 (thick line portion) is formed on the road surface 10 by the illumination from the vehicle-mounted illumination device 100. In this example, a vehicle (automobile) 40 travels on the road surface 10 from left to right in the drawing. Here, similarly to FIG. 1, the Y axis is defined in the traveling direction of the vehicle 40 (right direction in the drawing), and the Z axis is defined in the direction orthogonal to the road surface 10 (upper direction in the drawing). Although not illustrated in FIG. 2, the X-axis is directed to the front side perpendicular to the paper surface.

As illustrated, the illumination device 100 according to the invention is attached to the front of the vehicle 40, and the front of the road surface 10 is illuminated along an optical axis C. The illumination device 100 in the embodiment described here is a device different from a headlight and the like, and serves to illuminate a predetermined illumination area 20 on the road surface 10 to present a predetermined illumination pattern. Although FIG. 1 illustrates an example in which the illumination areas 21 to 25 are formed in arrow shapes, FIG. 2 illustrates an example in which a rectangular illumination area 20 is formed for the sake of convenience.

The illumination device 100 illustrated in FIG. 2 is a device different from a headlight or the like of an automobile but can be used as a headlight or can be incorporated in the headlight. Of course, the illumination device 100 can also be used as various illumination lights such as tail lights and search lights of automobiles and can be used by being incorporated in these various illumination lights or used by being attached to a bumper portion or the like.

The vehicle-mounted illumination device 100 illustrated in FIG. 2 has a function of forming a rectangular illumination area 20 on the road surface 10 located on an XY plane. The driver usually looks at the traveling direction of the road surface 10. Therefore, in order to bring the illumination area 20 into the center of the driver's visual field, it is necessary to form the illumination target area 20 at a considerable distance on the road surface 10. For example, FIG. 2 illustrates an example in which the illumination area 20 (thick line portion) extending 10 m in a longitudinal direction is formed 50 m ahead of the vehicle 40. In order to form the illumination area 20 at such a position, assuming that the installation height of the illumination device 100 is 75 cm, the angle θ (irradiation angle with respect to the illumination target surface) between the optical axis C and the road surface 10 is about 0.7°. In FIG. 2, for convenience, the size of θ is depicted as deformed, but in practice the angle between the optical axis C and the road surface 10 is extremely small.

As described above, unlike the general projector and the like, the vehicle-mounted illumination device 100 is characterized in that the irradiation angle θ of light with respect to the illumination target surface is extremely small. In a general projector, the reference of the irradiation angle θ is 90°. Thus, a usage form in which the irradiation angle θ is about 0.7° as in the above example is unexpected. Therefore, when an illumination mechanism used in a general projector is diverted as it is to a vehicle-mounted illumination device, it becomes difficult to obtain a clear projected image on a projection surface (illumination target surface).

In fact, as in the example illustrated in FIG. 2, when the length of the rectangular illumination area 20 in the Y axis direction extends to 10 m, the distance difference between the front and the back is 10 m. Thus, when a general projector is used, it is difficult to clearly display all the contour lines of the rectangular pattern presented as the illumination area 20. Therefore, when viewed from the driver or the pedestrian 30, the pattern projected on the road surface 10 is observed to be blurred.

In the illumination device 100 according to the invention, as described later, ideal parallel light can be generated using a point light source. Thus, the clear illumination area 20 with less blur can be formed on the road surface 10. Further, the incident light to the diffractive optical element can be scanned by the light scanning part. Thus, the direction of the diffracted light from the diffractive optical element can be changed, and the position of the illumination area 20 formed on the road surface 10 can be changed.

As described above, in § 1, an example of application to a vehicle-mounted illumination device has been described as a typical application example of the invention. Such an vehicle-mounted illumination device 100 is provided with an attaching part for attachment to the vehicle 40, and is attached on the front, rear, side, or the like of the vehicle 40 so that the illumination target surface set on the road surface 10 can be illuminated from the vehicle 40.

However, the illumination device according to the invention is not necessarily limited to the vehicle-mounted illumination device. The illumination device according to the invention can be mounted and used not only on vehicles such as automobiles and bicycles, but also on various vehicles including ships, planes, and trains. Moreover, the illumination device according to the invention is not only applied to the application mounted to such a vehicle but also attached to various structures to present various kinds of information. For example, the illumination device according to the invention is attached to a road surface, a structure installed near the road surface, a building, or the like, so as to be used for the purpose of presenting various information signs and guidance signs. Of course, the illumination target surface where the illumination area is formed by the illumination device according to the invention is not necessarily a plane, and a curved surface may be used as the illumination target surface depending on the application.

§ 2. Basic Principle of Invention

Figure 3:
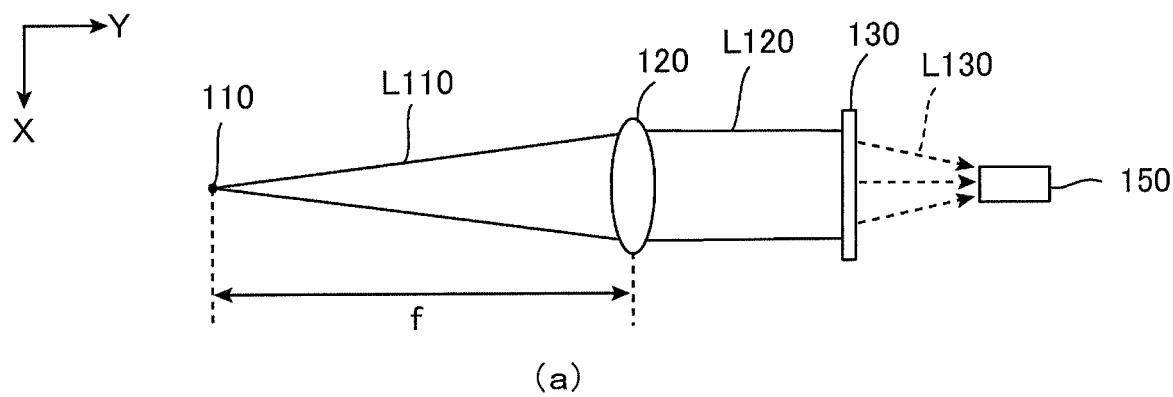
FIG. 3 is a top view illustrating a basic principle of forming an illumination area 150 on the illumination target surface by diffracted light of a diffractive optical element 130.
Figure 3:
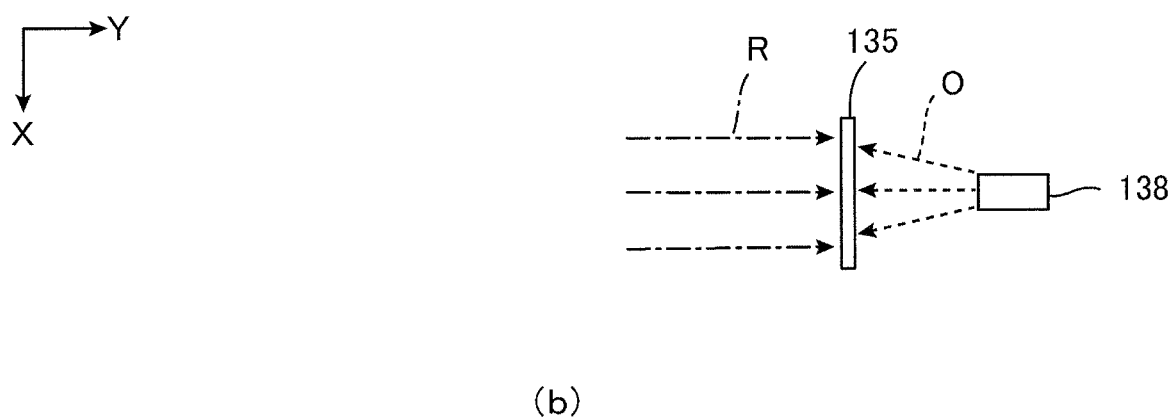

Then, the basic principle of the illumination device according to the invention will be described. FIG. 3 is a top view illustrating the basic principle for forming the illumination area on the illumination target surface by the diffracted light of the diffractive optical element. Here, first, the basic configuration of the illumination device is considered as illustrated in FIG. 3(*a*). This illumination device is configured by the point light source 110, a collimating optical system 120, and a diffractive optical element 130.

The point light source 110 is a conceptual light source that emits a spherical wave centered at a certain point. Therefore, in practice, in order to create the point light source 110, it is necessary to prepare a point light source generation part configured by specific devices. However, in the drawings, only the conceptual point light source 110 is drawn for convenience of explanation. Typically, a coherent light source such as a laser light source is preferably used for the point light source generation part. However, a non-coherent light source such as a light emitting diode (LED) light source may be used. The detailed configuration of the point light source generation part will be described later.

The collimating optical system 120 is a shaping optical system that shapes the divergent light L110 from the point light source 110 into parallel light L120 and can be configured by a general optical lens. If the front focal position of the collimating optical system 120 is made to coincide with the position (a diverging point of light) of the point light source 110, the divergent light L110 can be shaped into the parallel light L120. As illustrated, the point light source 110 is located on the optical axis of the collimating optical system 120 and is arranged such that the distance between the point light source 110 and the principal point of the collimating optical system 120 coincides with a focal length f of the collimating optical system 120.

The parallel light L120 shaped by the collimating optical system 120 is incident on the incident surface of the diffractive optical element 130 at a predetermined incident angle (the incident angle=0° in the illustrated example). The diffractive optical element 130 diffracts the incident parallel light L120 and emits the diffracted light as a diffracted light L130 from an emission surface. A predetermined illumination area 150 is formed on a predetermined illumination target surface by the diffracted light L130. In the case of the example illustrated in FIG. 3, the Y axis is defined in the right direction of the drawing, the X axis is defined in the lower direction, and the XY plane is the illumination target surface.

In a case where this illumination device is used as the vehicle-mounted illumination device, the illumination device may be attached to a vehicle such that the road surface 10 to be the illumination target surface is included in the XY plane as in the example illustrated in FIG. 2. If the illumination device is attached such that the Y axis direction is the traveling direction of the vehicle, as illustrated in FIG. 2, the illumination area 20 can be formed on the road surface 10 in front of the vehicle. The illumination area 150 illustrated in FIG. 3(*a*) is a rectangular graphic pattern formed on the road surface 10 in this manner.

The diffractive optical element 130 serves to diffract the parallel light L120 collimated by the collimating optical system 120 into a predetermined diffusion angle space so as to form the illumination area 150 having a predetermined size and shape at a predetermined position on a predetermined illumination target surface. In the case of the example described herein, the diffractive optical element 130 is configured by a hologram element in which interference fringes (diffraction patterns) are recorded, and the illumination area 150 on the XY plane is formed as a hologram reproduction image reproduced by the hologram element. In short, the diffractive optical element 130 is configured by a hologram element that forms a reproduced image on the predetermined illumination target surface 10 by the diffracted light L130, and the illumination area 150 is formed by the reproduced image. By using a hologram element as the diffractive optical element 130, it is easy to design diffraction characteristics, and it is possible to easily create a diffraction pattern capable of forming an illumination area 150 having a desired shape and area at a desired position.

FIG. 3(b) is a top view illustrating the principle of creating the hologram element having such a function. First, a hologram master plate 135 (a medium from which the diffractive optical element 130 is made) made of a photosensitive medium and a diffusion plate 138 (an object of which a reproduced image is the illumination area 150) to be an original image of the hologram master plate 135 are arranged at illustrated positions. Specifically, the hologram master plate 135 may be arranged at the position of the diffractive optical element 130 illustrated in FIG. 3(a), and the diffusion plate 138 may be arranged at the position of the illumination area 150 illustrated in FIG. 3(a).

Subsequently, the diffusion plate 138 is illuminated such that object light O from the diffusion plate 138 reaches the hologram master plate 135. At the same time, as illustrated in the drawing, the hologram master plate 135 is irradiated with a reference light R composed of parallel light (plane wave). At this time, the incident angle of the parallel reference light R on the hologram master plate 135 is made to be the same as the incident angle of the parallel light L120 illustrated in FIG. 3(a) on the diffractive optical element 130. Then, interference fringes formed by the object light O and the parallel reference light R may be recorded on the hologram master plate 135 made of a photosensitive medium. The hologram master plate 135 in which the interference fringes are recorded in this manner becomes the diffractive optical element 130 illustrated in FIG. 3(a).

When the reproduction illumination light is irradiated from the same direction as the parallel reference light R to the diffractive optical element 130 created by such a method, the illumination area 150 is formed as a reproduced image of the diffusion plate 138 at a position corresponding to the position of the diffusion plate 138.

FIG. 3(a) illustrates an example in which the parallel light L120 from the collimating optical system 120 is irradiated as the reproduction illumination light, and the illumination area 150 is formed as a reproduction image of the diffusion plate 138. In the case of the illustrated example, the rectangular diffusion plate 138 is used, and thus the illumination area 20 which is the reproduced image is also rectangular. However, if a diffuser plate having an arrow shape is used, an arrow-shaped illumination area is formed as the illumination area 21 is illustrated in FIG. 1. Therefore, in practice, any figure or character can be presented as the illumination area.

In addition, it is preferable that the diffractive optical element 130 (hologram element) based on the principle illustrated in FIG. 3(b) is practically a CGH (Computer Generated Hologram) created using a computer. That is, in practice, instead of performing an optical photosensitive process using the hologram master plate 135 and the diffusion plate 138, the diffractive optical element 130 may be created in such a manner that the photosensitive process is simulated on a computer, and interference fringes (diffraction pattern) determined by computer calculation are recorded in any medium. If the diffractive optical element 130 is created by the CGH, the optical system for forming interference fringes, the hologram master plate 135 for forming interference fringes, and the like are unnecessary, and the recording process of interference fringes can be performed on a computer. Thus, interference fringes having arbitrary diffraction characteristics can be easily generated.

In particular, in the case of the vehicle-mounted illumination device illustrated in FIG. 2, the distance (in the case of FIG. 3(b), the distance between the hologram master plate 135 and the diffusion plate 138) between a device body 100 and the illumination area 20 is very large, and it becomes difficult to carry out the optical photosensitive process. Thus, practically, the diffractive optical element 130 is necessarily created as the CGH.

The illumination device illustrated in FIG. 3(a) has a function of forming the illumination area 150 at a predetermined position on the illumination target surface (XY plane). However, the form such as the position, shape, and area of the illumination area 150 remains fixed. The main object of the invention is to change the form such as the position, shape, and area of the illumination area 150. Therefore, in the illumination device according to the invention, in addition to the components of the illumination device illustrated in FIG. 3(a), a light scanning part which scans light by emitting light while changing the direction of the incident light is added, and the incident angle of the parallel light L120 incident on the diffractive optical element 130 is changed by scanning by the light scanning part.

As described above, in the diffractive optical element (hologram element) 130 illustrated in FIG. 3(a), the interference fringes (diffraction pattern) of the object light O from the diffusion plate 138 having a predetermined shape and the parallel reference light R emitted from a predetermined direction are recorded by the creation process illustrated in FIG. 3(b). In this application, the incident angle of the parallel reference light R on the hologram master plate 135 in this creation process is referred to as a reference angle (in the illustrated example, reference angle=0°. Here, as illustrated in FIG. 3(a), if the parallel light L120 is emitted to the diffractive optical element 130 so that the incident angle becomes a reference angle, the illumination area 150 is formed at the illustrated position (a position corresponding to the position of the diffusion plate 138 illustrated in FIG. 3(b)). In other words, in the diffractive optical element 130, a hologram interference fringe is recorded in which the illumination area 150 (a reproduced image of the diffusion plate 138) is formed at such a position.

Generally, when a hologram is reproduced, it is premised that the reproduction light for illumination is emitted from the same direction as the reference light used in the creation process. Otherwise, a correct reproduction image cannot be obtained. That is, in the technical field using a hologram, it is common knowledge that the illumination reproduction light is emitted from the same direction as the reference light when obtaining a reproduced image. Contrary to such common sense, the fundamental technical idea of the invention is that the reproduction position of the reproduction image is shifted from the original position by emitting the reproduction light for illumination from the direction different from the reference light, so as to change the form such as the position, shape, and area of the illumination area formed at the position of the reproduced image.

In the diffractive optical element, the diffraction pattern is recorded according to the principle illustrated in FIG. 3(b), and the diffraction direction changes according to the change of the incident angle of the incident light. Therefore, in the case of the illumination device illustrated in FIG. 3(a), if the incident angle of the parallel light L120 incident on the diffractive optical element 130 is changed by any method, the diffraction direction of the diffracted light emitted from the diffractive optical element 130 changes according to the change of the incident angle of the parallel light L120. When the diffraction direction of the diffracted light is changed, the position, the shape, and the area of the illumination area 150 formed on the illumination target surface are changed according to the change.

After all, when the incident angle of the parallel light L120 incident on the diffractive optical element 130 is changed, the position, the shape, and the area of the illumination area 150 formed on the illumination target surface are changed according to the change. However, if the incident light to the diffractive optical element 130 is always parallel light (plane wave), there is a certain degree of correlation between the change of the incident angle of the parallel light L120 and the change of the position of the illumination area 150 generated accordingly.

For example, in the case of the example illustrated in FIG. 3, when the traveling direction of the parallel light L120 is inclined in the negative direction of the X axis, the diffracted light is also displaced in the negative direction of the X axis, and the position of the illumination area 150 formed on the XY plane moves in the negative direction of the X axis. On the other hand, when the traveling direction of the parallel light L120 is inclined in the positive direction of the X axis, the diffracted light is also displaced in the positive direction of the X axis, and the position of the illumination area 150 formed on the XY plane moves in the positive direction of the X axis. This corresponds to the operation of moving the illumination area 21 to the left and right illumination areas 22 and 23 in the example illustrated in FIG. 1.

Similarly, in the example illustrated in FIG. 3, if the Z axis is defined in the front direction perpendicular to the paper surface, and the traveling direction of the parallel light L120 is inclined in the negative direction of the Z axis (a back side direction on the paper surface), when the diffracted light is also displaced in the negative direction of the Z axis (the irradiation angle θ in FIG. 2 becomes large), the position of the illumination area 150 formed on the XY plane moves in the negative direction of the Y axis. On the other hand, if the traveling direction of the parallel light L120 is inclined in the positive direction of the Z axis (a front direction of the paper surface), when the diffracted light is also displaced in the positive direction of the Z axis (the irradiation angle θ in FIG. 2 becomes small), the position of the illumination area 150 formed on the XY plane moves in the positive direction of the Y axis. This corresponds to the operation of moving the illumination area 24 to the front and rear illumination areas 21 and 25 in the example illustrated in FIG. 1.

As described above, when the direction of the diffracted light from the diffractive optical element 130 changes, the projection conditions with respect to the illumination target surface (XY plane) change. Thus, the illumination area 150 changes not only in position but also in shape and area. However, in the illumination area 150 formed in the vicinity of the illumination device, the change in shape or area is not so remarkable as compared with the change in the position. Therefore, in the nearby illumination areas 21, 22, and 23 illustrated in FIG. 1, the change in the shape or the area is not so noticeable. On the other hand, comparing the nearby illumination area 21 and the distant illumination area 25 illustrated in FIG. 1, the latter is stretched in the Y axis direction compared to the former, and the changes in shape and area become remarkable. However, when viewed from the driver of the vehicle 40, the distant illumination area 25 looks small due to the influence of perspective, so that the change in shape and area is not so noticeable.

In particular, when the light scanning part scans the parallel light L120 incident on the diffractive optical element 130, if the scanning is performed to increase or decrease a reference angle with the incident angle of the parallel reference light R as the reference angle (reference angle=0° in the illustrated example), a reference position can be moved to back and forth and right and left sides with the position (the position of the original hologram reproduction image) of the illumination area 150 illustrated in FIG. 3(a) as the reference position. Thus, the operation can be performed mainly on the change of the position while the shape and the area are maintained as much as possible. In this application, a scanning position at which the incident angle of parallel light incident on the diffractive optical element is the above reference angle is referred to as a reference scanning position.

Incidentally, the case where the illumination target surface is a plane is described here. However, when the illumination target surface is a spherical surface, there may be a case where the position of the illumination area changes due to the change of the direction of the diffracted light, but the shape and the area do not change. According to the invention, when such a case is included, at least one of the position, shape, and area of the illumination area formed on the illumination target surface (including a curved surface) is changed according to the change in the incident angle of the parallel light to the diffractive optical element.

In addition, if the light scanning part performs periodic scanning in at least one direction and periodically changes the incident angle of the parallel light L120 incident on the diffractive optical element 130, the illumination area moving periodically can be formed on the illumination target surface. That is, since the incident angle of the parallel light L120 incident on the diffractive optical element 130 changes with time, the position of the formed illumination area also temporally changes, and when viewed through time, a plurality of illumination areas 150 can be formed on the illumination target surface. The cycle in which the position of the illumination area makes a round depends on the scanning cycle of the light scanning part.

For example, if the direction of parallel light L120 is periodically changed in the X axis direction (horizontally along the XY plane) by the light scanning part, it is possible to make a presentation to move the illumination area laterally when viewed from the driver of vehicle 40. In addition, if the direction of the parallel light L120 is periodically changed in the Z axis direction (vertically along the YZ plane) by the light scanning part, the illumination area is viewed in the front-rear direction as viewed from the driver of the vehicle 40. It is possible to make a presentation to move. As described above, the position, shape, and area of the illumination area to be presented are determined according to the diffraction pattern (interference fringes) recorded in advance in the diffractive optical element 130.

In general, when the incident light to the diffractive optical element is non-parallel light, a slight shift of the installation position of the diffractive optical element causes an unintended shift of the diffraction angle, and as a result, the reproduced image by the diffracted light becomes unclear. In the illumination device according to the invention, even when scanning is performed by the light scanning part, incident light to the diffractive optical element always becomes parallel light (plane wave) except for some embodiments. Moreover, since this parallel light is obtained by collimating divergent light from the point light source by the collimating optical system, the parallelism of light becomes extremely high. Therefore, even when the light scanning part is added, it is possible to form a clear illumination area with suppressed blurring. In addition, since the incident angle of the parallel light to the diffractive optical element is changed by the scanning by the light scanning part, it is possible to change the form such as the position, shape, and area of the illumination area with a simple configuration.

Incidentally, a method of adding the light scanning part to the illumination device illustrated in FIG. 3(a) includes two following methods. A first method is a method in which the light scanning part is inserted between the point light source 110 and the collimating optical system 120, and the divergent light L110 incident on the collimating optical system 120 is scanned by the light scanning part. In this application, this first method will be described as a first embodiment. On the other hand, a second method is a method in which the light scanning part is inserted between the collimating optical system 120 and the diffractive optical element 130, and the parallel light L120 incident on the diffractive optical element 130 is scanned by the light scanning part. In this application, this second method is described as a second embodiment.

§ 3. First Embodiment of Invention (Transmission Type Light Scanning Part)

Figure 4:
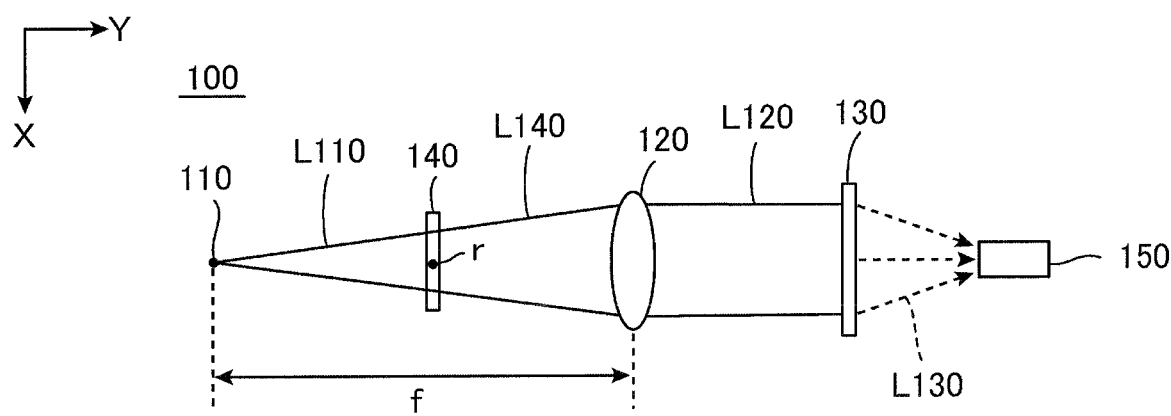
FIG. 4 is a top view illustrating a basic configuration of the illumination device 100 according to a first embodiment of the invention.

Here, in the first embodiment of the invention, the embodiment using a transmission type light scanning part will be described. FIG. 4 is a top view illustrating a basic configuration of the illumination device 100 according to the first embodiment. This illumination device 100 is obtained by inserting a light scanning part 140 between the point light source 110 and the collimating optical system 120 of the illumination device illustrated in FIG. 3(a).

The light scanning part 140 includes a transmission type scanning body (a plate-like member indicated by reference numeral 140 in the drawing) that emits light incident on a first surface (a left surface in the drawing) from a second surface (a right surface in the drawing) and a scanning mechanism (a driving mechanism including a motor and the like: not illustrated) for performing scanning while rotating the transmission type scanning body about a predetermined rotation axis r as a central axis. A refractive member such as a transparent plate-shaped member and a prism can be used as a transmission type scanning body. By rotating these members, the traveling direction of the emitted light can be changed.

In the illustrated example, the rotation axis r is an axis parallel to the Z axis, that is, an axis perpendicular to the paper surface. By operating the scanning mechanism, the transmission type scanning body rotates clockwise or counterclockwise in the drawing. The divergent light L110 from the point light source 110 is transmitted through this transmission type scanning body to be directed to the collimating optical system 120. By the scanning of the scanning mechanism, the direction of the light transmitted through the transmission type scanning body changes in the X axis direction (a direction along the XY plane). As described above, the light scanning part 140 has a function of changing the direction of the divergent light L110 directed to the collimating optical system 120 and scanning the light L140 incident on the collimating optical system 120.

When such scanning is performed, the incident angle of the scanning light L140 with respect to the collimating optical system 120 changes, so the direction of the parallel light L120 emitted from the collimating optical system 120 changes. Then, the incident angle of the parallel light L120 with respect to the diffractive optical element 130 changes, and the direction of the diffracted light L130 from the diffractive optical element 130 changes. As a result, the position of the illumination area 150 formed on the illumination target surface changes.

As described above, since the distance between the collimating optical system 120 and the point light source 110 is set to be equal to the focal length f of the collimating optical system 120, the light L120 emitted from the collimating optical system 120 becomes parallel light with high parallelism. Therefore, the parallel light with high parallelism is applied as the incident light L120 to the diffractive optical element 130. This is important in order to obtain the clear illuminated area 150 with suppressed blurring.

Figure 5:
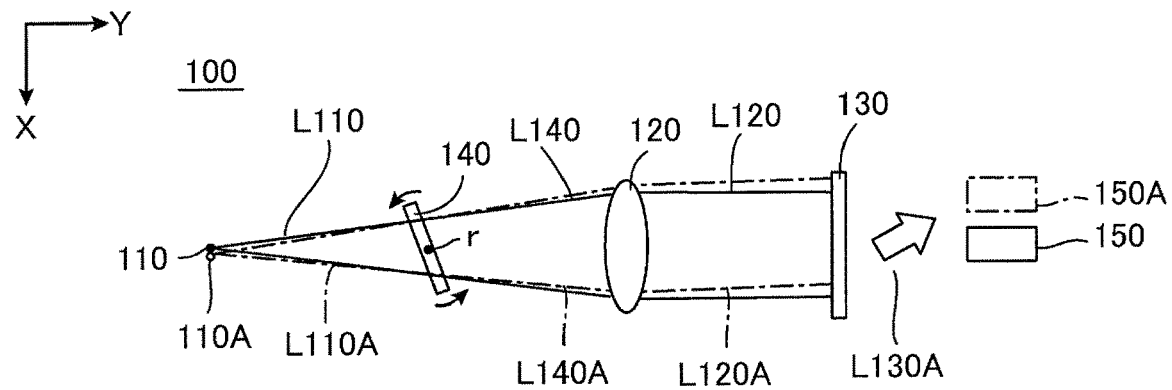
FIG. 5 is a top view illustrating an operation principle of the illumination device 100 according to the first embodiment of the invention illustrated in FIG. 4.
Figure 5:
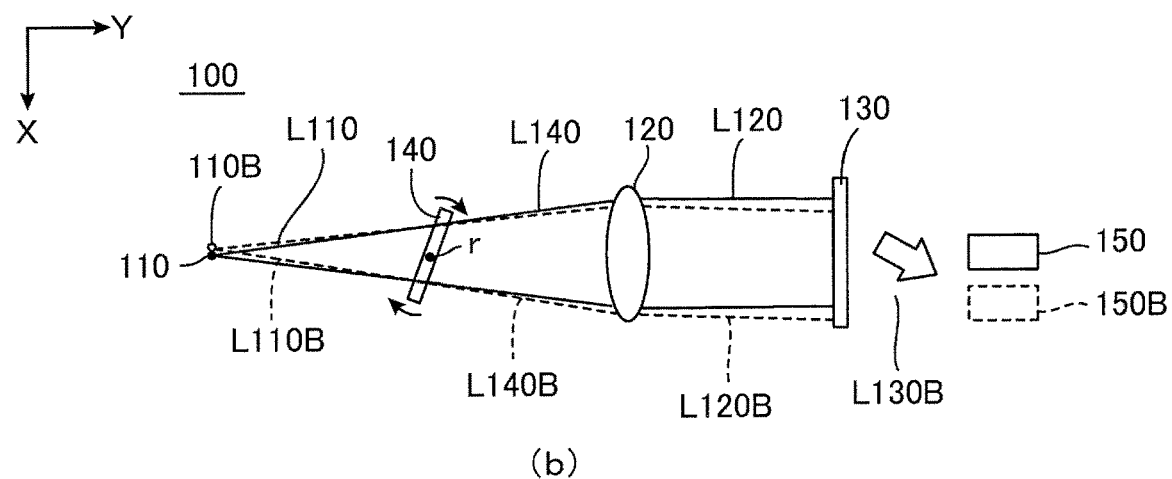
Figure 5:
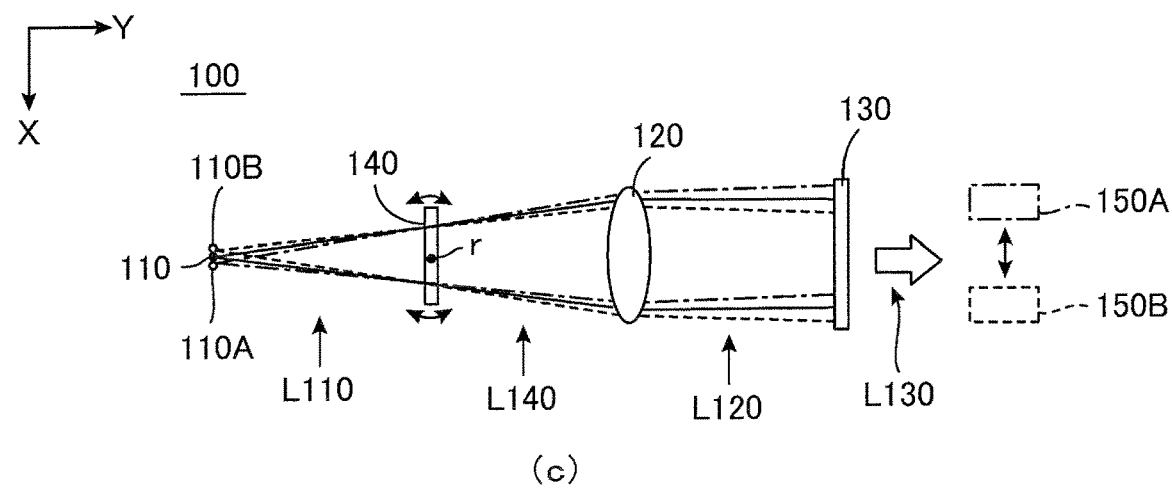

FIG. 5 is a diagram illustrating the operation principle of the illumination device 100 illustrated in FIG. 4. The point light source 110, the light scanning part 140, the collimating optical system 120, and the diffractive optical element 130 illustrated in FIGS. 5(a) to 5(c) all have the same reference numerals as in the illumination device 100 illustrated in FIG. 4. The arrangement of each component is the same as that of the illumination device 100 illustrated in FIG. 4. However, FIG. 5(a) illustrates a state in which the light scanning part 140 is turned counterclockwise, and FIG. 5(b) illustrates a state in which the light scanning part 140 is turned clockwise. Also, the optical paths (L110, L140, L120) shown by solid lines in FIGS. 5(a) to 5(c) are exactly the same as the optical paths of the same reference numerals indicated by solid lines in FIG. 4. An optical path indicated by a one-dot chain line or a broken line indicates an optical path changed by the scanning of the light scanning part 140.

First, FIG. 5(a) is a top view illustrating a state where the direction of the divergent light L140 from the point light source 110 is changed in the negative direction of the X axis by rotating the light scanning part 140 counterclockwise with the rotation axis r as the central axis. Since the point light source 110 itself does not move, the divergent light L110 from the point light source 110 is directed to the light scanning part 140 as indicated by the solid line (the optical path of the divergent light L110 is the same as the optical path illustrated in FIG. 4). However, since the light scanning part 140 rotates counterclockwise, the light which passes through the light scanning part 140 is not the L140 indicated by the solid line, but a L140A indicated by the one-dot chain line.

As a result, the incident position and the incident angle of the scanning light L140 with respect to the collimating optical system 120 change, and the light emitted from the collimating optical system 120 is not the L120 indicated by the solid line but a L120A indicated by the one-dot chain line. However, since the distance between the collimating optical system 120 and the point light source 110 coincides with the focal length f of the collimating optical system 120, the light L120A emitted from the collimating optical system 120 maintains parallel light. In other words, it appears from the collimating optical system 120 that the position of the point light source 110 (black circle) is changed to the position of an apparent point light source 110A (white circle) by the rotation of the light scanning part 140, and it seems that divergent light L110A (indicated by a one-dot chain line) from the apparent point light source 110A has been incident. For this reason, from collimating optical system 120, the parallel light L120A indicated by the one-dot chain line is emitted.

Thus, the parallel light L120A indicated by the one-dot chain line is incident on the diffractive optical element 130. The parallel light L120A indicated by the one-dot chain line is parallel light similar with the parallel light L120 indicated by the solid line, but the incident angle is different. For this reason, diffracted light L130A (only a rough direction is indicated by a white arrow for convenience of illustration) emitted from the diffractive optical element 130 is inclined in the negative direction of the X axis as compared with the diffracted light L130 illustrated in FIG. 4, and an illumination area 150A is formed as indicated by a one-dot chain line in the drawing. That is, the illumination area 150 obtained before scanning by the light scanning part 140 moves in the negative direction of the X axis to be the illumination area 150A.

On the other hand, FIG. 5(b) is a top view illustrating a state where the direction of the divergent light L140 from the point light source 110 is changed in the positive direction of the X axis (a downward direction in the drawing) by rotating the light scanning part 140 clockwise with the rotation axis r as the central axis. The divergent light L110 from the point light source 110 is directed to the light scanning part 140 as indicated by the solid line. However, since the light scanning part 140 is rotated clockwise, the light which passes through the light scanning part 140 is not the L140 indicated by the solid line but a L140B indicated by the broken line.

As a result, the light emitted from the collimating optical system 120 is not the L120 indicated by the solid line, but a L120B indicated by the broken line. Also in this case, it appears from the collimating optical system 120 that the position of the point light source 110 (black circle) is changed to the position of an apparent point light source 110B (white circle) by the rotation of the light scanning part 140, and it seems that divergent light L110B (indicated by the broken line) from the apparent point light source 110B has been incident. For this reason, from collimating optical system 120, the parallel light L120B indicated by the broken line is emitted.

Thus, the parallel light L120B indicated by the broken line is incident on the diffractive optical element 130. The parallel light L120B indicated by the broken line is parallel light similar with the parallel light L120 indicated by the solid line, but the incident angle is different. For this reason, diffracted light L130B (only a rough direction is indicated by a white arrow for convenience of illustration) emitted from the diffractive optical element 130 is inclined in the positive direction of the X axis as compared with the diffracted light L130 illustrated in FIG. 4, and an illumination area 150B is formed as indicated by the broken line in the drawing. That is, the illumination area 150 obtained before scanning by the light scanning part 140 moves in the positive direction of the X axis to be the illumination area 150B.

As described above, in the diffractive optical element 130 (hologram element), diffraction patterns (interference fringes) are formed in which the parallel light L120 irradiated at a plurality of incident angles is diffracted in different directions. Therefore, when the incident angle of the parallel light L120 with respect to the diffractive optical element 130 changes, the direction of the diffracted light L130 also changes, and the illumination area 150 formed on the illumination target surface moves. Here, the moving direction and the moving amount of the illumination area 150 are determined according to the scanning direction and the scanning amount by the light scanning part 140.

FIG. 5(c) illustrates the state illustrated in FIG. 5(a) and the state illustrated in FIG. 5(b) in the same drawing. The optical path shown by the solid line indicates a state before scanning is performed by the light scanning part 140 (a state when the light scanning part 140 is at a predetermined reference scanning position, and the incident angle of the parallel light L120 to the diffractive optical element 130 becomes a reference angle), the optical path indicated by the one-dot chain line indicates a state when the counterclockwise scanning is performed by the light scanning part 140, and the optical path indicated by the broken line indicates a state when the clockwise scanning is performed by the light scanning part 140. For example, the reference scanning position (the rotational position of the transmission type scanning body) of the light scanning part 140 may be set to a position where an illumination area is formed at the same position as the illumination area 150 illustrated in FIG. 3(a) by the diffracted light L130 emitted from the diffractive optical element 130.

As illustrated, the actual point light source 110 is arranged at a position indicated by a black circle, and the divergent light L110 from the point light source always takes an optical path indicated by a solid line without being scanned by the light scanning part 140. However, due to the scanning of the light scanning part 140, the position of the apparent point light source seen from the collimating optical system 120 changes to the positions 110A and 110B indicated by white circles. As a result, the incident angle of the parallel light L120 to the diffractive optical element 130 changes, and the position of the illumination area 150 formed on the illumination target surface (in this example, the XY plane) changes. As described above, when the projection position of the illumination area 150 changes, the shape and area of the illumination area also change slightly. That is, the change of the incident angle of the parallel light L120 to the diffractive optical element 130 causes the change of the position, shape, and area of the illumination area 150. However, when viewed from the driver, changes in shape and area are not so remarkable as compared with changes in position.

When the light scanning part 140 is scanned, the apparent position of the point light source 110 seen from the collimating optical system 120 changes, and the distance between the apparent position and the collimating optical system 120 does not exactly coincide with the focal length f of the collimating optical system 120. That is, when scanning is performed, the apparent position of the point light source 110 deviates from a front focal surface of the collimating optical system 120. However, if the apparent position of the point light source 110 is set to coincide with the front focal position of the collimating optical system 120 at least when the light scanning part 140 is at the reference scanning position, the scanning angle is limited to be reduced to a certain degree, so that the parallel light L120 with practically sufficient parallelism can be obtained even when scanning is performed, and the clear illumination area 150 with sufficiently suppressed blur can be formed.

In short, the collimating optical system 120 may be arranged such that the front focal position thereof coincides with the position of the point light source 110 at least when the light scanning part 140 is at a predetermined reference scanning position.

Incidentally, ideally, it is most preferable that the apparent position of the point light source 110 moves on the front focal surface of the collimating optical system 120 when scanning is performed. The movement locus of the apparent position of the point light source 110 is arc-shaped (in the case of one-dimensional scanning) or spherical (in the case of two-dimensional scanning). Thus, when the front focal surface of the collimating optical system 120 is a plane, as described above, the apparent position of the point light source 110 deviates from the front focal surface. However, in general, in the lens design, by intentionally adding "field curvature adjustment (adjustment that the image plane is not a flat surface but a curved surface)", the collimating optical system 120 can be designed such that the front focal surface becomes a curved surface. Therefore, if a design is made such that the movement locus of the apparent position of the point light source 110 coincides with the focal curved surface of such collimating optical system 120, even when the scanning is performed, the apparent position of the point light source 110 can be made move on the front focal surface of the collimating optical system 120, the parallel light L120 with high parallelism can be obtained, and the clear illumination area 150 without blurring can be formed.

When the light scanning part 140 performs periodical scanning, the illumination area 150 performs periodical movement. For example, assuming that a predetermined scanning position is 0°, a positive angle is defined in the counterclockwise direction, and a negative angle is defined in the clockwise direction, and the rotational position of the light scanning part 140 is represented by an angle. If periodical scanning is performed with one cycle of a rotation operation of 0°→+10°→0°→-10°→0°, the formed illumination area 150 reciprocate between the illumination area 150A and the illumination area 150B illustrated in the drawing. Therefore, when viewed from the driver, it is observed that the rectangular illumination area reciprocates left and right on the front road surface 10.

Figure 6:
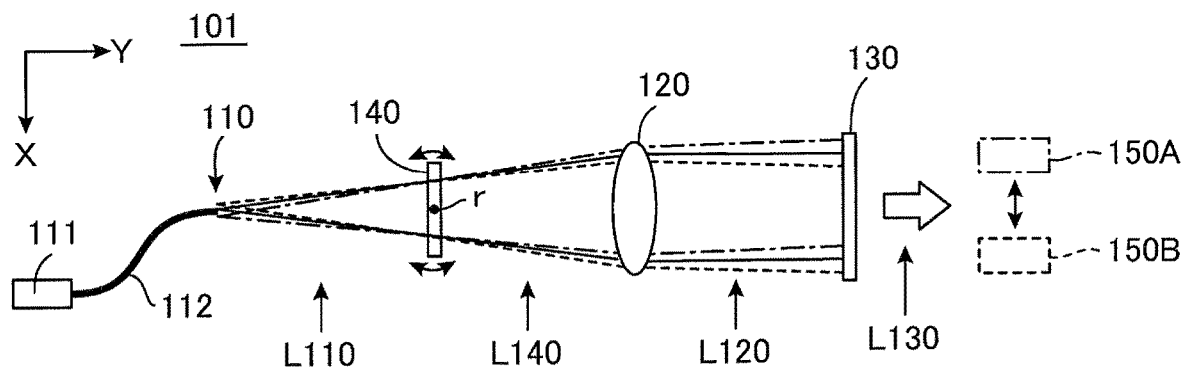
FIG. 6 is a top view illustrating Examples 1 to 3 in which a portion of a point light source 110 of the illumination device 100 according to the first embodiment of the invention illustrated in FIG. 5(c) is configured by a specific device.
Figure 6:
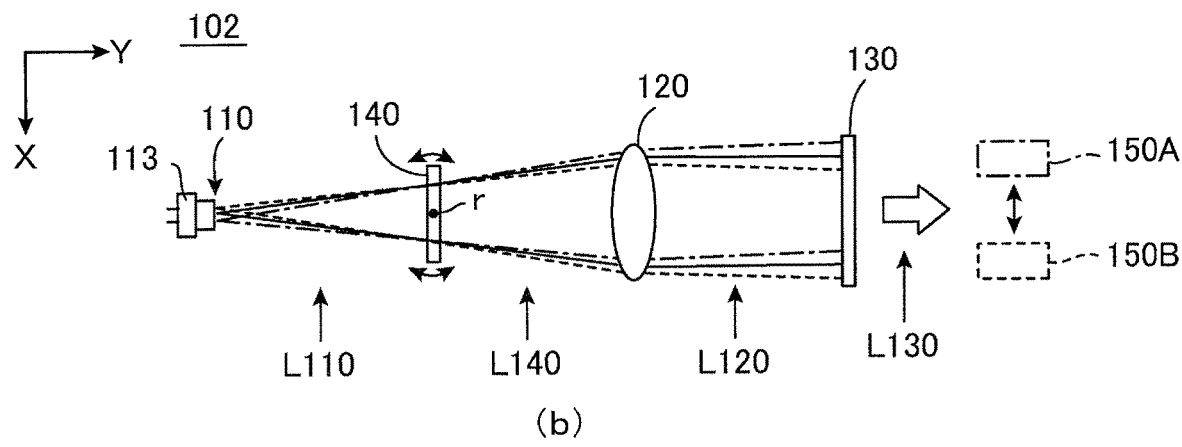
Figure 6:
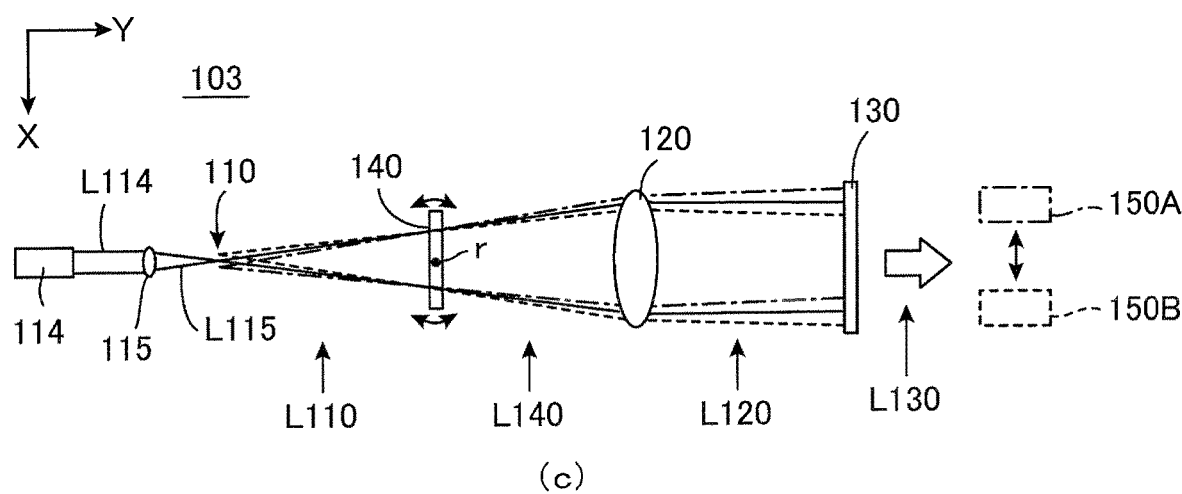

FIG. 6 is a top view illustrating specific Examples 1 to 3 of the illumination device according to the first embodiment of the invention. Examples 1 to 3 of the first embodiment are examples in which the point light source generation part for generating the point light source 110 in the illumination device 100 illustrated in FIG. 5(c) is configured in each specific device.

The illumination device 101 illustrated in FIG. 6(a) is a device corresponding to Example 1 of the first embodiment, and a point light source generation part is configured by a laser light source 111 and an optical fiber 112 which guides the laser beam generated by and this laser light source 111 from the root end to the tip end. In the case of the first embodiment, since light is emitted from the tip end of the optical fiber 112, the point light source 110 is generated at the position (divergence point) of the tip end. Incidentally, a plurality of laser light sources 111 may be provided. For example, a plurality n of laser light sources 111 and a plurality n of optical fibers 112 are prepared, and laser beams generated by the individual laser light sources 111 are introduced into the individual optical fibers 112, and the tip ends of the individual optical fibers 112 are collected to one point, so that the one point becomes the point light source 110.

The illumination device 102 illustrated in FIG. 6(b) is a device corresponding to Example 2 of the first embodiment, and the point light source generation part is configured by a laser module 113. The laser module 113 has a function of emitting laser light from the diverging point of the tip end, and the point light source 110 is generated at the position of the diverging point.

The illumination device 103 illustrated in FIG. 6(c) is a device corresponding to Example 3 of the first embodiment, and the point light source generation part is configured by a light source device 114 and a condensing lens 115 which condenses light from the light source device 114. The light source device 114 may be a laser light source (coherent light source) or a general light source such as an LED light source (non-coherent light source). However, in order to sharpen the edge portion of the formed illumination area 150, it is desirable to use a light source that emits coherent light such as laser light.

The condensing lens 115 is a lens having a function of condensing the illumination light L114 from the light source device 114 at one point. When the illumination light L114 is parallel light, refraction light from the condensing lens 115 is condensed at the back focal position of the condensing lens 115 and then diverges from this condensing position. Therefore, the point light source 110 is generated at this condensing position. Also in this case, all the light may be condensed to a point to be the light source 110 by using a plurality n of light source devices 114 and a plurality n of condensing lenses 115.

§ 4. Second Embodiment of Invention
(Transmission Type Light Scanning Part)

Figure 7:
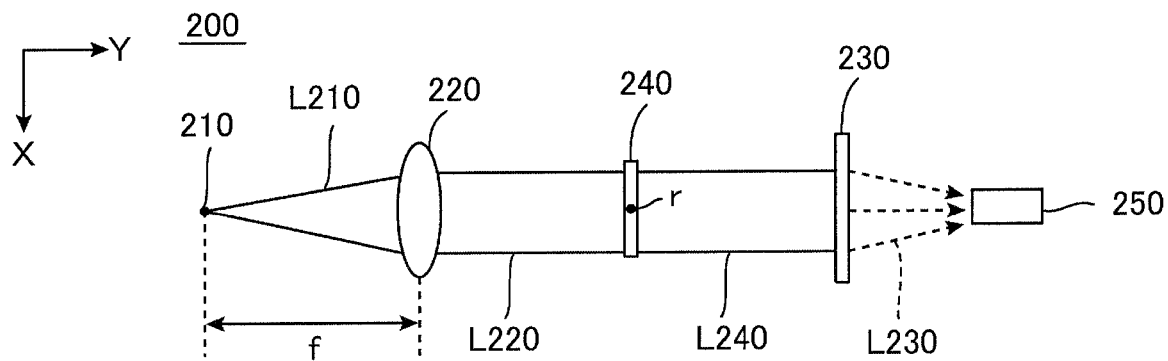
FIG. 7 is a top view illustrating a basic configuration of an illumination device 200 according to a second embodiment of the invention.

Here, in the second embodiment of the invention, the embodiment using a transmission type light scanning part will be described. FIG. 7 is a top view illustrating a basic configuration of an illumination device 200 according to the second embodiment. This illumination device 200 is obtained by inserting a light scanning part between the collimating optical system 120 and the diffractive optical element 130 of the illumination device illustrated in FIG. 3(a).

As described above, the difference between the first embodiment and the second embodiment is the position where the light scanning part is inserted, and there is no fundamental difference between the individual components themselves. Therefore, hereinafter, reference numerals obtained by replacing the 100s of the reference numerals of the corresponding components of the first embodiment with the 200s will be used for the components of the second embodiment. For example, the individual components 210, 220, 230, 240, and 250 of the illumination device 200 illustrated in FIG. 7 correspond to the individual components 110, 120, 130, 140, and 150 of the illumination device 100 illustrated in FIG. 4, and there is no large difference between respective basic functions.

The fundamental difference between the illumination device 100 illustrated in FIG. 4 and the illumination device 200 illustrated in FIG. 7 is that the light scanning part 140 is arranged between the point light source 110 and the collimating optical system 120 in the former case, and the light scanning part 240 is arranged between the collimating optical system 220 and the diffractive optical element 230 in the latter. In other words, the illumination device 200 illustrated in FIG. 7 can have an arrangement order obtained by reversing the arrangement of the light scanning part 140 and the collimating optical system 120 in the illumination device 100 illustrated in FIG. 4.

In the case of the illumination device 200 illustrated in FIG. 7, the divergent light L210 from the point light source 210 is first collimated through the collimating optical system 220. Herein, since the distance between the collimating optical system 220 and the point light source 210 is set to be equal to the focal length f of the collimating optical system 220, the divergent light L210 passes through the collimating optical system 220 and is emitted as parallel light L220. Then, the parallel light L220 enters the light scanning part 240.

The light scanning part 240 includes a transmission type scanning body (a plate-like member indicated by reference numeral 240 in the drawing) that emits light incident on a first surface (a left surface in the drawing) from a second surface (a right surface in the drawing) and a scanning mechanism (a driving mechanism including a motor and the like: not illustrated) for performing scanning while rotating the transmission type scanning body about a predetermined rotation axis r as a central axis. A transparent plate-like member or a refractive member such as a prism can be used as the transmission type scanning body, and the traveling direction of the emitted light can be changed by rotating these members.

Also in this example, the rotation axis r is an axis parallel to the Z axis, that is, an axis perpendicular to the paper surface, and by operating the scanning mechanism, the transmission type scanning body rotates clockwise or counterclockwise in the drawing. The parallel light L220 from the collimating optical system 220 passes through the transmission type scanning body of the light scanning part 240 and is directed to the diffractive optical element 230. At this time, when the transmission type scanning is performed by the scanning mechanism of the light scanning part 240, the direction of the parallel light L240 having transmitted through the body changes in the X axis direction (the direction along the XY plane). Thus, the light scanning part 240 has a function of changing the direction of the parallel light L220 directed to the diffractive optical element 230 and scanning the parallel light L240 incident on the diffractive optical element 230 on the diffractive optical element 230.

When such scanning is performed, the incident angle of the parallel light L240 with respect to the diffractive optical element 230 changes. Thus, the direction of the diffracted light L230 from the diffractive optical element 230 changes with time. As a result, the position of the illumination area 250 formed on the illumination target surface changes with time.

Figure 8:
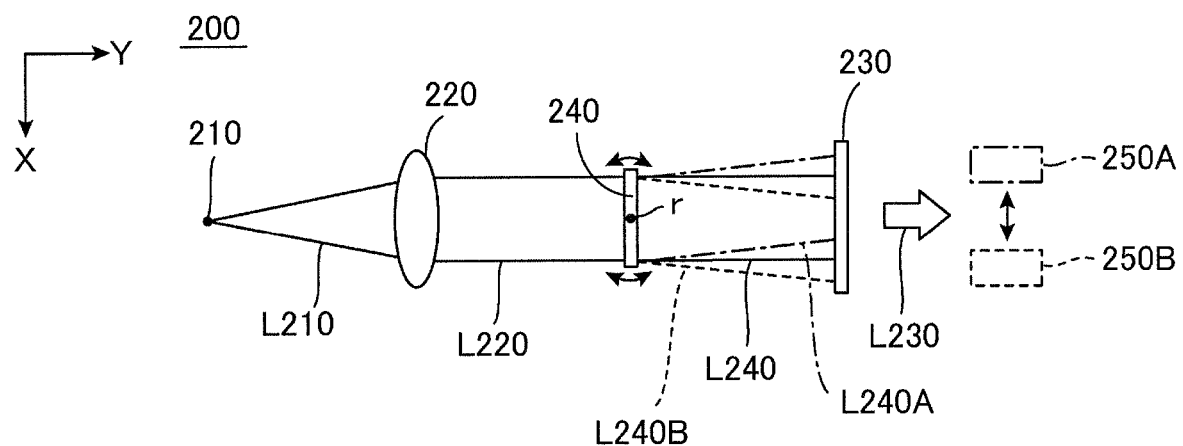
FIG. 8 is a top view illustrating an operation principle of the illumination device 200 according to the second embodiment of the invention illustrated in FIG. 7.

FIG. 8 is a diagram illustrating an operation principle of the illumination device 200 illustrated in FIG. 7. The divergent light L210 from the point light source 210 is collimated by the collimating optical system 220, and the optical path of the solid line in which the parallel light L220 travels toward the light scanning part 240 is always constant regardless of the scanning of the light scanning part 240. Here, in a case where the scanning position of the light scanning part 240 is at a position where the incident parallel light L220 is emitted in the same direction, the light scanning part 240 emits the parallel light L240 indicated by the solid line. However, when the light scanning part 240 is at the scanning position rotated counterclockwise, the light scanning part 240 emits the parallel light L240A indicated by the one-dot chain line, and when the light scanning part 240 is at the scanning position rotated clockwise, the light scanning part 240 emits parallel light L240B indicated by the broken line.

As a result, the incident angle of the parallel light incident on the diffractive optical element 230 changes, and the position of the illumination area 250 formed on the illumination target surface (in this example, the XY plane) changes. When the light scanning part 240 performs periodic scanning, the illumination area 250 performs periodic movement, and for example, reciprocates between an illumination area 250A and an illumination area 250B illustrated in the drawing. Therefore, also in this case, when viewed from the driver, it is observed that the rectangular illumination area reciprocates left and right on the front road surface 10.

In the second embodiment, the distance between the collimating optical system 220 and the point light source 210 is always set to be equal to the focal length f of the collimating optical system 220. For this reason, the parallel light L220 with high parallelism is always emitted from the collimating optical system 220, and the parallel light 240 emitted from the light scanning part 240 also has high parallelism. The illumination area 250 formed on the illumination target surface is formed by the diffracted light L230 based on such parallel light L240 with high parallelism. This is important in order to obtain the clear illumination area 250 with suppressed blurring.

Figure 9:
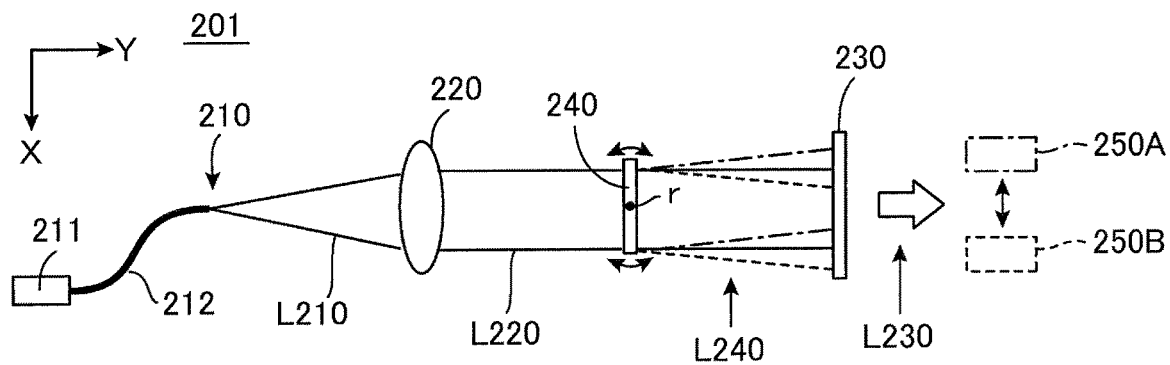
FIG. 9 is a top view illustrating Examples 1 to 3 in which a portion of a point light source 210 of the illumination device 200 according to the second embodiment of the invention illustrated in FIG. 8 is configured by a specific device.
Figure 9:
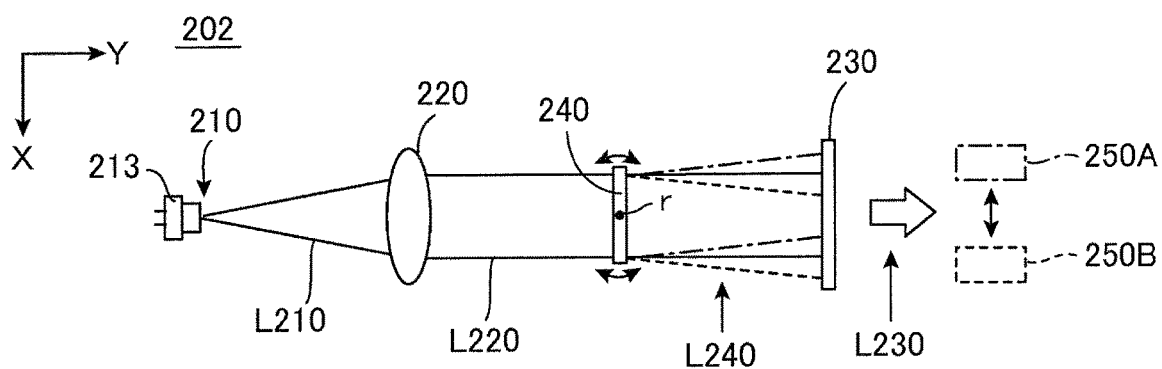
Figure 9:
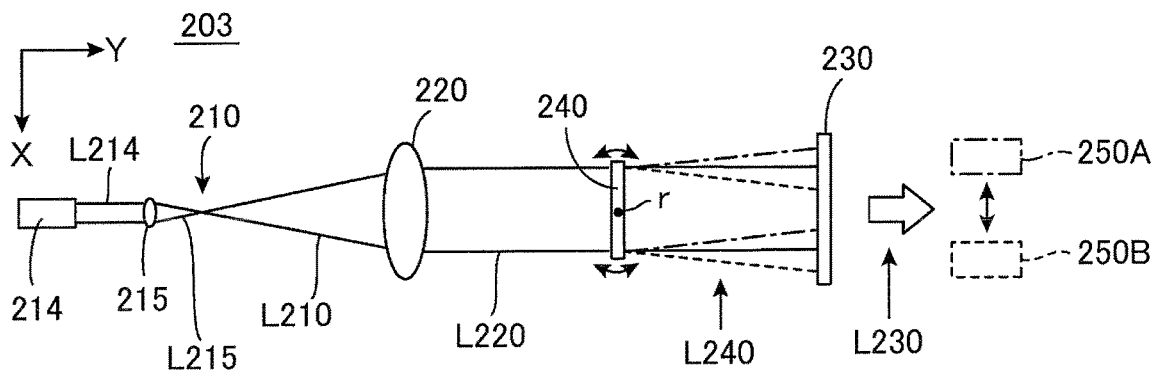

FIG. 9 is a top view illustrating specific Examples 1 to 3 of the illumination device according to the second embodiment of the invention. In Examples 1 to 3 of the second embodiment, the point light source generation part for generating the point light source 210 in the illumination device 200 illustrated in FIG. 8 is configured in each specific device.

The illumination device 201 illustrated in FIG. 9(*a*) is a device corresponding to Example 1 of the second embodiment, and the point light source generation part is configured by a laser light source 211 and an optical fiber 212 guides the laser beam generated by this laser light source 211 from the root end to the tip end. In the case of the first embodiment, since light is emitted from the tip end of the optical fiber 212, the point light source 210 is generated at the position (divergence point) of the tip end. Also in the case of the example described here, a plurality n of laser light sources 211 and a plurality n of optical fibers 212 are prepared, the laser beams generated by the individual laser light sources 211 are introduced into the individual optical fibers 212, and the tip ends of the individual optical fibers 212 may be collected at one point (a point to be the point light source 210).

The illumination device 202 illustrated in FIG. 9(*b*) is a device corresponding to Example 2 of the second embodiment, and the point light source generation part is configured by a laser module 213. The laser module 213 has a function of emitting laser light from the diverging point of the tip, and the point light source 210 is generated at the position of the diverging point.

The illumination device 203 illustrated in FIG. 9(*c*) is a device corresponding to Example 3 of the second embodiment, and the point light source generation part is configured by a light source device 214 and a condensing lens 215 which condenses light from the light source device 214. The light source device 214 may be a laser light source (coherent light source) or a general light source such as an LED light source (non-coherent light source). The condensing lens 215 is a lens having a function of condensing the illumination light L214 from the light source device 214 at one point. In a case where the illumination light L214 is parallel light, the refraction light from the condensing lens 215 is condensed at the back focal position of the condensing lens 215 and then diverges from this condensing position. Therefore, the point light source 210 is generated at this condensing position. Also in this case, all the light may be condensed to a point to be the light source 210 by using a plurality n of light source devices 214 and a plurality n of condensing lenses 215.

§ 5. First Embodiment of Invention (Reflection Type Light Scanning Part)

In the above-described § 3, the first embodiment of the invention has been described on the basis of the example using the transmission type light scanning part. Herein, the first embodiment of the invention will be described on the basis of an example using a reflection type light scanning part.

Figure 10:
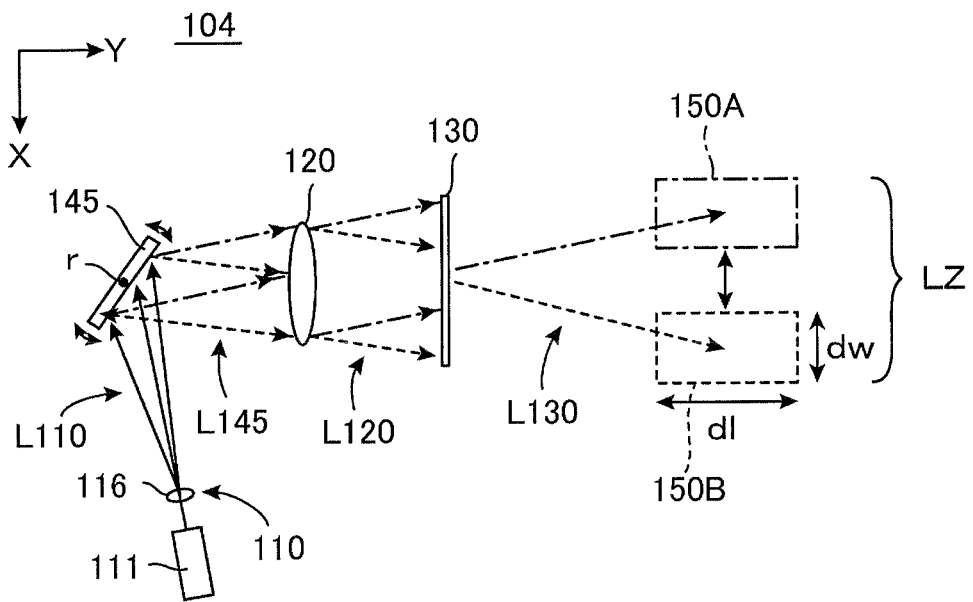
FIG. 10 is a top view illustrating Example 4 of the illumination device according to the first embodiment of the invention.

FIG. 10 is a top view illustrating Example 4 of the illumination device according to the first embodiment of the invention. In an illumination device 104 according to a fourth embodiment, the point light source generation part for generating the point light source 110 is configured by the laser light source 111 and a diverging lens 116 for diverging the laser light generated by the laser light source 111. The laser light generated by the laser light source 111 is a thin beam of light, but is expanded conically by the diverging lens 116, and the beam diameter is expanded. In other words, the divergent light L110 that spreads from the diverging point in the diverging lens 116 is obtained. Therefore, the point light source 110 is generated at the position (divergence point) of the diverging lens.

The divergent light L110 from the point light source 110 is reflected by a light scanning part 145 and is incident on the collimating optical system 120 to be collimated therein. The parallel light L120 emitted from the collimating optical system 120 is incident on the diffractive optical element 130, and the diffused light L130 therefrom forms the illumination area 150 on the illumination target surface. The light scanning part 145 has a function of scanning light by emitting the incident divergent light L110 while changing the direction of the light, and the incident angle of the parallel light L120 incident on the diffractive optical element 130 is changed by the scanning of the light scanning part 145. Thus, the illumination area formed on the illumination target surface moves between the illumination area 150A and the illumination area 150B.

The arrangement order and operation principle of each component of the illumination device 104 illustrated in FIG. 10 are the same as those of the illumination device 100 illustrated in FIG. 4. That is, in both the illumination device 100 illustrated in FIG. 4 and the illumination device 104 illustrated in FIG. 10, the divergent light L110 from the point light source 110 is given to the collimating optical system 120 through the light scanning part 140 or 145, and the parallel light L120 shaped by this collimating optical system 120 is incident on the diffractive optical element 130. Then, the direction of the light L140 or L145 incident on the collimating optical system 120 is changed by the scanning of the light scanning part 140 or 145, and the incident angle of the parallel light L120 incident on the diffractive optical element 130 is changed.

However, while the transmission type light scanning part 140 is used in the illumination device 100 illustrated in FIG. 4, the reflection type light scanning part 145 is used in the illumination device 104 illustrated in FIG. 10. Therefore, the mutual arrangement of the components is slightly changed.

The light scanning part 145 includes a reflection type scanning body (a plate-like member indicated by reference numeral 145 in the drawing) having a reflection surface that reflects and emits incident light and a scanning mechanism (a driving mechanism including a motor and the like: not illustrated) for performing scanning while rotating the reflection type scanning body about the predetermined rotation axis r as a central axis. A general reflection member such as a reflection mirror having a pivotable structure can be used as the reflection type scanning body, and the traveling direction of the reflected light can be changed by rotating the reflection type scanning body.

In the illustrated example, the rotation axis r is an axis parallel to the Z axis, that is, an axis perpendicular to the paper surface. By operating the scanning mechanism, the reflection type scanning body rotates clockwise or counterclockwise in the drawing. The divergent light L110 from the point light source 110 is reflected by this reflection type scanning body to be directed to the collimating optical system 120. By the scanning of the scanning mechanism, the direction of the light transmitted through the reflection type scanning body changes in the X axis direction (the direction along the XY plane). After all, the light scanning part 145 has a function of changing the direction of the divergent light L110 directed to the collimating optical system 120 and scanning the reflected light L145 incident on the collimating optical system 120.

When such scanning is performed, the incident angle of the reflected light L145 with respect to the collimating optical system 120 changes, so the direction of the parallel light L120 emitted from the collimating optical system 120 changes. Then, the incident angle of the parallel light L120 with respect to the diffractive optical element 130 changes, and the direction of the diffracted light L130 from the diffractive optical element 130 changes. As a result, the position of the illumination area 150 formed on the illumination target surface changes.

For example, at the scanning position where the reflection type scanning body is rotated counterclockwise, the reflected light L145, the parallel light L120, and the diffracted light L130 take an optical path indicated by a one-dot chain line, and the illumination area 150A indicated by a one-dot chain-line rectangle is formed on the illumination target surface. At the scanning position where the reflection type scanning body is rotated clockwise, the reflected light L145, the parallel light L120, and the diffracted light L130 take an optical path indicated by a broken line, and the illumination area 150B indicated by a broken-line rectangle is formed on the illumination target surface (incidentally, the illustrated one-dot chain line or broken line is for convenience of explanation and do not indicate an accurate optical path of light. For example, the one-dot chain line or broken line indicating the reflected light L145 does not indicate the optical path of the individual reflected light from each reflection position but conceptually indicates the direction of the entire reflected light L145. Similarly with the divergent light L110, the actual reflected light L145 becomes divergent light that travels while spreading. The same applies to FIGS. 11 and 12).

In the illustrated example, the illumination areas 150A and 150B formed on the illumination target surface become an area having a shape in which the length in the longitudinal direction dl (Y axis direction) is larger than the length in the width direction dw (X axis direction). These lengths can be set arbitrarily. However, when the vehicle-mounted type illumination device 100 illustrated in FIG. 2, the advancing direction of the vehicle 40 is set to a longitudinal direction dl, and the direction orthogonal to the longitudinal direction is set to a width direction dw, it is preferable to use an illumination pattern in which the length in the longitudinal direction dl is larger than the length in the width direction dw. This is because the longitudinal direction dl appears to be shrunk than the width direction dw according to the theory of perspective in the view seen from the driver, and thus the illumination pattern having a larger length in the longitudinal direction dl presents a lighting pattern having an more appropriate aspect ratio.

When the light scanning part 145 performs periodical scanning, the illumination area 150 performs periodical movement, and for example, reciprocates between the illumination area 150A and the illumination area 150B illustrated in the drawing. In this case, when viewed from the driver, a state is observed in which the rectangular illumination area reciprocates left and right (X axis direction) in an illumination zone LZ (a rectangular zone including the illumination area 150A and the illumination area 150B) on the front road surface 10.

The collimating optical system 120 is a shaping optical system that shapes the reflected light L145 into the parallel light L120. However, when the light scanning part 145 is at a predetermined reference scanning position, the front focal position of the collimating optical system 120 is arranged to coincide with the position of the point light source 110. Incidentally, in the case of the embodiment using the reflection type light scanning part, the light scanning part 145 is configured using a reflection member such as a reflection mirror. Thus, the front focal position of the collimating optical system 120 does not coincide with the actual position of the point light source 110, but coincides with the position (virtual image position) of the point light source 110 generated in the mirror. Thus, in this application, a case where "the focal position coincides with the position of the point light source" includes a case where "the focal position coincides with the virtual image position of the point light source".

For example, in a case where the scanning position of the light scanning part 145 illustrated in FIG. 10 is set to the reference scanning position, the front focal position of the collimating optical system 120 coincides with the point light source 110 generated by the reflection surface of the light scanning part 145. That is, the distance between the virtual image position of the point light source 110 and the collimating optical system 120 coincides with the focal length f of the collimating optical system 120. With such an arrangement, the collimating optical system 120 can emit the parallel light L120 with high parallelism, and a clear illumination area 150 with suppressed blurring can be formed.

When the light scanning part 145 is scanned, the apparent position of the point light source 110 seen from the collimating optical system 120 changes, and the distance between the apparent position and the collimating optical system 120 does not exactly coincide with the focal length f of the collimating optical system 120. However, as described in the embodiment (§ 3) of the transmission type light scanning part, if the apparent position of the point light source 110 is set to coincide with the front focal position of the collimating optical system 120 at least when the light scanning part 145 is at the reference scanning position, the scanning angle is limited to be reduced to a certain degree, so that the parallel light L120 with practically sufficient parallelism can be obtained even when scanning is performed, and the clear illumination area 150 with sufficiently suppressed blur can be formed. In short, the collimating optical system 120 may be arranged such that the front focal position thereof coincides with the position (virtual image position) of the point light source 110 at least when the light scanning part 145 is at a predetermined reference scanning position.

As described also in the embodiment (§ 3) using the transmission type light scanning part, ideally, it is most preferable that the apparent position (the position of the apparent virtual image) of the point light source 110 moves on the front focal surface of the collimating optical system 120 when scanning is performed. Therefore, also in the case of the embodiment using the reflection type light scanning part described here, when the collimating optical system 120 is designed, by intentionally adding "field curvature adjustment", the collimating optical system 120 can be designed such that the front focal surface becomes a curved surface. If such a collimating optical system 120 is used, the design is made such that the movement locus of the apparent position of the point light source 110 coincides with the focal curved surface. Then, even when scanning is performed, the apparent position of the point light source 110 can be made to move on the front focal surface of the collimating optical system 120, the parallel light L120 with high parallelism can be obtained, and the clear illumination area 150 without blurring can be formed.

In this way, the illumination device 104 according to the fourth embodiment illustrated in FIG. 10 adopts the same configuration as the illumination devices 100 to 103 described in § 3 except that a reflective type is used as the light scanning part 145. The basic operation thereof is the same as that of the illumination devices 100 to 103 described in § 3.

Figure 11:
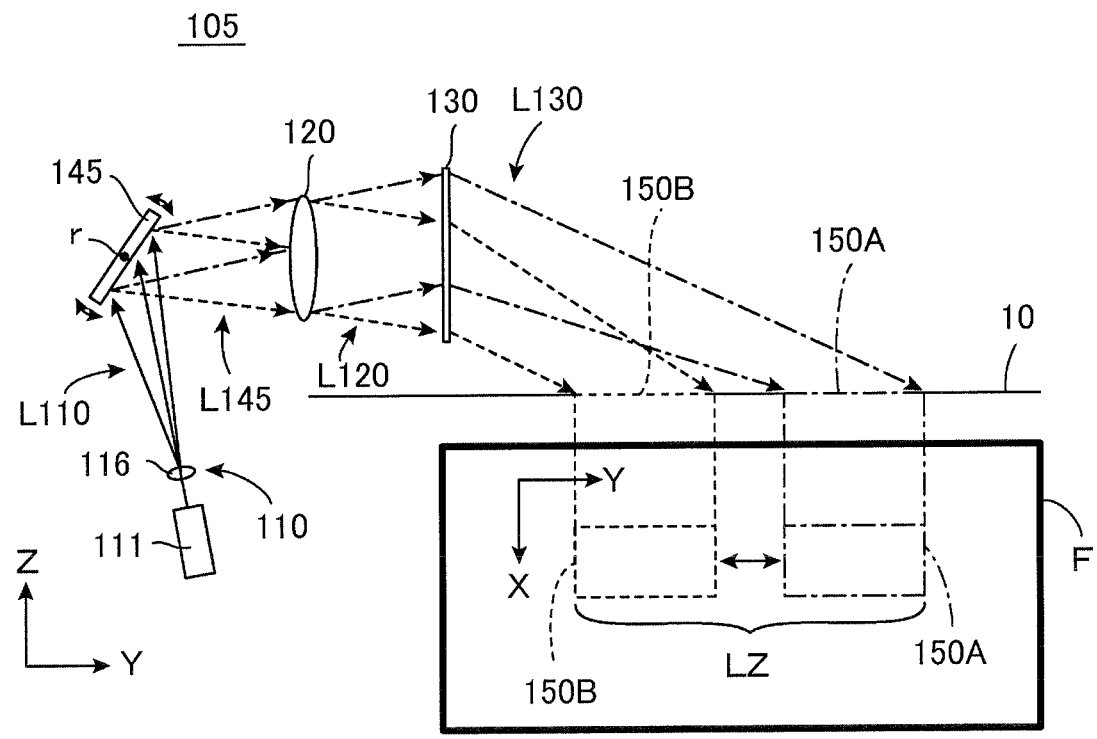
FIG. 11 is a side view (a top view in a thick frame F) illustrating Example 5 of the illumination device according to the first embodiment of the invention.

FIG. 11 is a side view (a top view in a thick frame F) illustrating Example 5 of the illumination device according to the first embodiment of the invention. The components of the illumination device 105 according to the fifth embodiment are basically the same as the components of the illumination device 104 illustrated in FIG. 10 described above. However, the arrangement of each component is slightly different. That is, while FIG. 10 is a top view (a view looking down on the XY plane) of the illumination device 104, FIG. 11 is a side view (a view with the YZ plane as a background) of the illumination device 105 (However, a thick frame F is a top view). Therefore, the arrangement of each component of the illumination device 105 with respect to the road surface 10 (XY plane) is different from the arrangement of each component of the illumination device 104 illustrated in FIG. 10, and the optical operation is also slightly different.

Specifically, while the light scanning part 145 of the illumination device 104 illustrated in FIG. 10 scans the reflected light L145 in the X axis direction (the horizontal direction along the XY plane), the light scanning part 145 of the illumination device 105 illustrated in FIG. 11 scans the reflected light L145 in the Z axis direction (the vertical direction along the YZ plane). In other words, the light scanning part 145 of the illumination device 105 illustrated in FIG. 11 rotates a reflection type scanning body (a plate-like member indicated by reference numeral 145 in the drawing) about the rotation axis r parallel to the X axis as a central axis.

Therefore, at the scanning position where the reflection type scanning body is rotated counterclockwise, the reflected light L145, the parallel light L120, and the diffracted light L130 take an optical path indicated by a one-dot chain line, and the illumination area 150A indicated by a one-dot chain line is formed on the illumination target surface (the road surface 10 on the XY plane). At the scanning position where the reflection type scanning body is rotated clockwise, the reflected light L145, the parallel light L120, and the diffracted light L130 take an optical path indicated by a broken line, and the illumination area 150B indicated by a broken line is formed on the illumination target surface (incidentally, the illustrated one-dot chain line or broken line is for convenience of explanation and do not indicate an accurate optical path of light).

The thick frame F in the drawing is a top view of the illumination target surface (road surface 10). As illustrated, the illumination area 150A indicated by a one-dot chain-line rectangle is formed far from the driver, and the illumination area 150B indicated by a broken-line rectangle is formed near the driver. Therefore, when the light scanning part 145 performs periodical scanning, the illumination area 150 performs periodical movement, and reciprocates between the illumination area 150A and the illumination area 150B illustrated in the drawing. Therefore, when viewed from the driver, a state is observed in which the rectangular illumination area reciprocates back and forth (Y axis direction) in the illumination zone LZ (a rectangular zone including the illumination area 150A and the illumination area 150B) on the front road surface 10.

Figure 12:
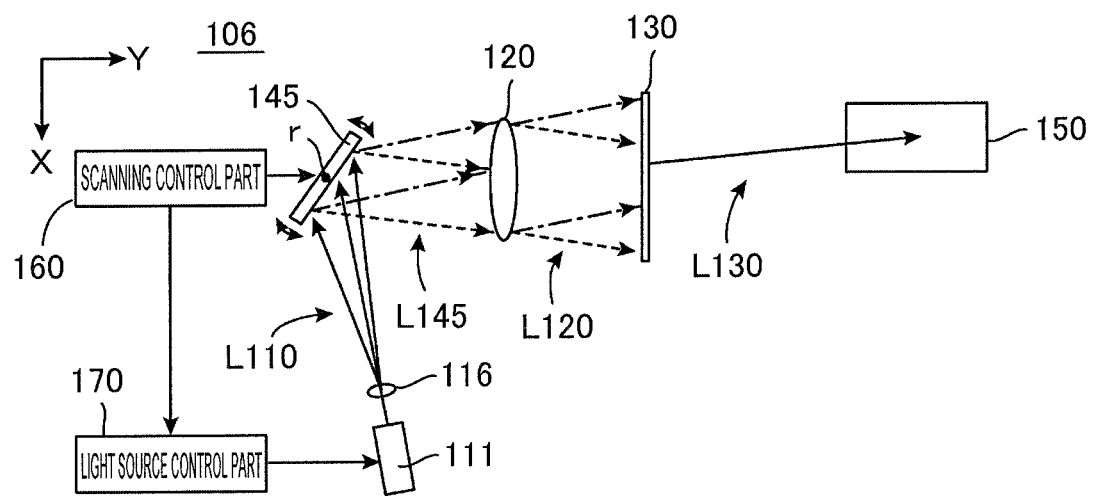
FIG. 12 is a top view (partly a block diagram) illustrating Example 6 of the illumination device according to the first embodiment of the invention.

FIG. 12 is a top view (partly a block diagram) illustrating Example 6 of the illumination device according to the first embodiment of the invention. An illumination device 106 according to a sixth embodiment is obtained by adding a scanning control part 160 and a light source control part 170 illustrated as blocks to the components of the illumination device 104 illustrated in FIG. 10.

The scanning control part 160 is a component having a function of controlling the scanning by the light scanning part 145, and for example, is configured by an electronic circuit that supplies a predetermined control signal to the scanning mechanism of the light scanning part 145. On the other hand, the light source control part 170 is a component having a function of controlling turning on or off by the point light source generation part, and for example, can be configured by an electronic circuit that gives the laser light source 111 a control signal instructing turning on or off. As a result, the light source control part 170 can control turning on or off of the point light source.

The feature of the illumination device 106 is that the control of turning on or off the point light source by the light source control part 170 is performed in conjunction with the scan control by the scanning control part 160. As illustrated, the scanning control part 160 gives the light source control part 170 the signal indicating the scanning position of the light scanning part 145 at each point in time. Therefore, when the scanning state by the light scanning part 145 becomes a specific scanning position (when the incident angle of the parallel light L120 with respect to the diffractive optical element 130 becomes a specific value), the light source control part 170 gives the laser light source 111 the control signal instructing turning on or off. With such a control of turning on or off, it is possible to form the illumination area 150 only at a desired position.

For example, in the description of the embodiments illustrated in FIGS. 10 and 11, an example is described in which the illumination area is reciprocally moved within the illumination zone LZ by performing periodic scanning by the light scanning part 145. In this case, if the light source control part 170 is controlled to turn on the point light source 110 only when the diffracted light L130 is directed the position of the illumination area 150A and turn off the point light source 110 at other times, although the light scanning part 145 continues the periodic scanning, only the illumination area 150A is actually illuminated. In other words, when viewed from the driver, the rectangular illumination area does not reciprocate and appears to be stationary at one place (the position of the illumination area 150A). Of course, if the lighting timing by the light source control part 170 is shifted (if the phase at the time of lighting with respect to the periodic scanning is changed), only the illumination area 150B can be illuminated, or only any other position can be illuminated.

In short, if the scanning control part 160 controls the light scanning part 145 to perform scanning control such that periodic scanning is performed, and the light source control part 170 performs control to turn on at a specific scanning position and turn off at other scanning positions in synchronization with this scanning control, only the illumination area corresponding to the specific scanning position is illuminated. The illumination area 150 illustrated in FIG. 12 indicates the illumination area formed at an arbitrary position by such control. Of course, if the point light sources are turned on at a plurality of scanning positions, illumination areas can be formed at a plurality of locations, respectively.

As described above, if the turning on-or-off of the point light source is controlled by the light source control part 170, not only the illumination area can be formed at an arbitrary position, but also the lighting time of the light source (for example, the laser light source 111) included in the point light source generation part can be shortened. Thus, power consumption can be reduced, and the life of the light source can be extended.

Hereinbefore, the embodiment (hereinafter, referred to as the on/off control mode) is described in which the scanning control part 160 and the light source control part 170 are added to the illumination device 104 illustrated in FIG. 10 to perform the control of the turning on-or-off of the point light source. However, this on/off control mode is similarly applicable to another embodiment (for example, the embodiment using the transmission type light scanning part described in § 3).

Figure 13:
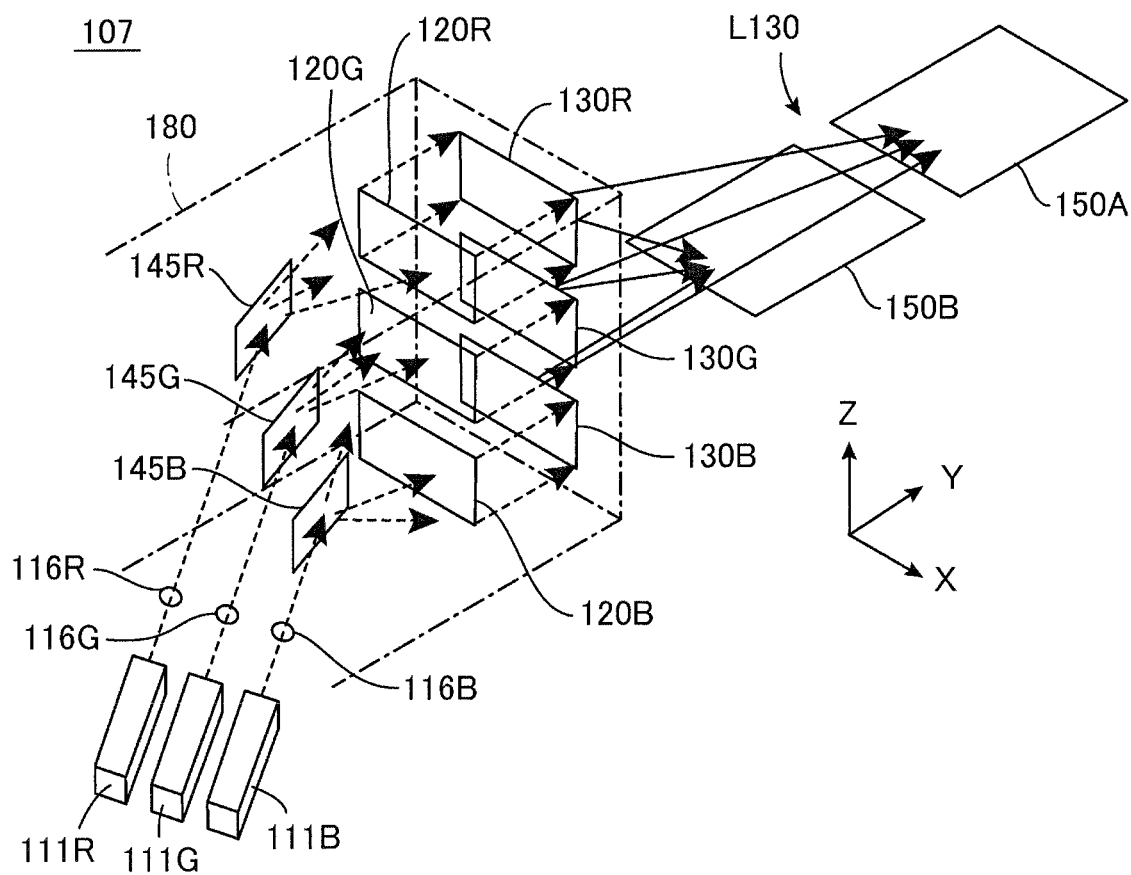
FIG. 13 is a perspective view illustrating Example 7 of the illumination device according to the first embodiment of the invention.

FIG. 13 is a perspective view illustrating Example 7 of the illumination device according to the first embodiment of the invention. The embodiments described so far are illumination devices premised on illumination with a single color. However, when two or more sets of such illumination devices are provided to change the wavelength band of the illumination light by each illumination device, it is possible to configure an illumination device that performs color illumination.

The illumination device 107 illustrated in FIG. 13 is a color illumination device which can form an illumination area having a desired color by providing three sets of illumination devices 105 illustrated in FIG. 11. Among the three sets of illumination devices, a first illumination device is a device that performs red illumination, and in FIG. 13, each component of this first illumination device is indicated by adding R to the end of the reference numeral. Similarly, a second illumination device is a device that performs green illumination, and in FIG. 13, each component of this second illumination device is indicated by adding G to the end of the reference numeral. Further, a third illumination device is a device that performs blue illumination, and in FIG. 13, each component of this third illumination device is indicated by adding B to the end of the reference numeral.

The three sets of illumination devices are incorporated in the same device housing 180. Herein, the point light source generation part 111R of the first illumination device generates a red point light source, the point light source generation part 111G of the second illumination device generates a green point light source, and the point light source generation part 111B of the third illumination device generates a blue point light source. In practice, a laser light source for generating laser light of each color may be used.

The operation of each illumination device is the same as that of the illumination device 105 illustrated in FIG. 11, and thus the description thereof is omitted here. However, a diffractive optical element 130R of the first illumination device forms a red illumination area, a diffractive optical element 130G of the second illumination device forms a green illumination area, and a diffractive optical element 130B of the third illumination device forms a blue illumination area. In the case of the example illustrated in FIG. 13, the diffraction patterns recorded in the diffractive optical elements 130R, 130G, and 130B are adjusted such that the red illumination area, the green illumination area, and the blue illumination area are the same area. In addition, the light scanning parts 145R, 145G, and 145B perform scanning in synchronization (for example, a single scanning control part 160 may supply a common scanning control signal). Thus, both the illumination area 150A formed at a certain the scanning position and the illumination area 1508 formed at another scanning position are a color illumination area in which the illumination areas of three colors overlap each other or an area illuminated by the composite color of three colors.

If the intensity of light generated by each of the point light source generation parts 111R, 111G, and 111B can be individually controlled (control intermediate intensity as well as the turning on-or-off) (for example, the light source control part 170 may give individual an output control signals), the composition ratio of red, green and blue components of light can be adjusted freely. Thus, the color of the color illumination area can be set to an arbitrary color. Of course, it is also possible to change the illumination color depending on the formation position of the color illumination area.

The red illumination area, the green illumination area, and the blue illumination area do not necessarily have to completely overlap each other, and may be mutually offset. In any case, a color illumination area of a predetermined color is formed in an overlapping portion of the red illumination area, the green illumination area, and the blue illumination area. As in the illustrated example, when the illumination areas of three colors completely overlap, the entire overlap area becomes the color illumination area. However, when the illumination areas of the respective colors do not overlap only partially, the overlapping portion becomes the color illumination area, and the non-overlapping part is the monochromatic illumination area.

§ 6. Second Embodiment of Invention (Reflection Type Light Scanning Part)

In the above-described § 4, the second embodiment of the invention has been described on the basis on the example using the transmission type light scanning part. Here, the second embodiment of the invention will be described on the basis of an example using a reflection type light scanning part.

Figure 14:
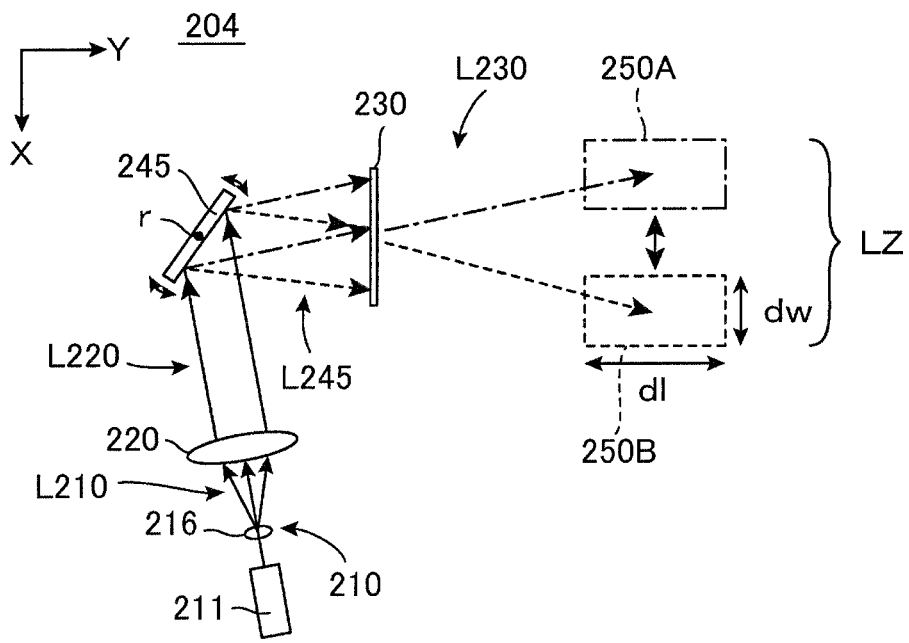
FIG. 14 is a top view illustrating Example 4 of the illumination device according to the second embodiment of the invention.

FIG. 14 is a top view illustrating Example 4 of the illumination device according to the second embodiment of the invention. In an illumination device 204 according to the fourth embodiment, the point light source generation part for generating the point light source 210 is configured by the laser light source 211 and a diverging lens 216 for diverging the laser light generated by the laser light source 211. The laser light generated by the laser light source 211 is a thin beam of light, but is expanded conically by the diverging lens 216, and the beam diameter is expanded. In other words, the divergent light L210 that spreads from the diverging point in the diverging lens 216 is obtained. Therefore, the point light source 210 is generated at the position (divergence point) of the diverging lens.

The divergent light L210 from the point light source 210 is incident on the collimating optical system 220 to be collimated therein. The parallel light L220 emitted from the collimating optical system 220 is reflected by the light scanning part 245 and is incident on the diffractive optical element 230, and the diffused light L230 therefrom forms the illumination area 250 on the illumination target surface.

The light scanning part 245 has a function of scanning light by emitting the incident parallel light L220 while changing the direction of the light, and the incident angle of the parallel light L245 incident on the diffractive optical element 230 is changed by the scanning of the light scanning part 245. Thus, the illumination area formed on the illumination target surface moves between the illumination area 250A and the illumination area 250B.

The arrangement order and operation principle of each component of the illumination device 204 illustrated in FIG. 14 are the same as those of the illumination device 200 illustrated in FIG. 7. That is, in both the illumination device 200 illustrated in FIG. 7 and the illumination device 204 illustrated in FIG. 14, the divergent light L210 from the point light source 210 is given to the light scanning part 240 or 245 through the collimating optical system 220, and the parallel light L220 shaped by the collimating optical system 220 is incident on the light scanning part 240 or 245. Then, the incident angle of the parallel light L240 or L245 incident on the diffractive optical element 230 is change by the scanning of the light scanning part 240 or 245.

However, while the transmission type light scanning part 240 is used in the illumination device 200 illustrated in FIG. 7, the reflection type light scanning part 245 is used in the illumination device 204 illustrated in FIG. 14. Therefore, the mutual arrangement of the components is slightly changed.

The light scanning part 245 includes a reflection type scanning body (a plate-like member indicated by reference numeral 245 in the drawing) having a reflection surface that reflects and emits incident light and a scanning mechanism (a driving mechanism including a motor and the like: not illustrated) for performing scanning while rotating the reflection type scanning body about the predetermined rotation axis r as a central axis. A general reflection member such as a reflection mirror having a pivotable structure can be used as the reflection type scanning body, and the traveling direction of the reflected light can be changed by rotating the reflection type scanning body.

In the illustrated example, the rotation axis r is an axis parallel to the Z axis, that is, an axis perpendicular to the paper surface. By operating the scanning mechanism, the reflection type scanning body rotates clockwise or counterclockwise in the drawing. The divergent light L210 from the point light source 210 is first collimated through the collimating optical system 220 and is incident on the light scanning part 245 as the parallel light L220. Then, the parallel light L220 from the collimating optical system 220 is reflected by the reflection type scanning body to be directed to the diffractive optical element 230. At this time, by the scanning of the scanning mechanism, the direction of the reflected parallel light L245 reflected by the reflection type scanning body changes in the X axis direction (the direction along the XY plane). After all, the light scanning part 245 has a function of changing the direction of the reflected parallel light L245 directed to the diffractive optical element 230 and scanning the reflected parallel light L245 on the diffractive optical element 230.

When such scanning is performed, the incident angle of the reflected parallel light L245 with respect to the diffractive optical element 230 changes, and the direction of the diffracted light L230 from the diffractive optical element 230 changes. As a result, the position of the illumination area 250 formed on the illumination target surface changes.

For example, at the scanning position where the reflection type scanning body is rotated counterclockwise, the reflected parallel light L245 and the diffracted light L230 take an optical path indicated by a one-dot chain line, and the illumination area 250A indicated by a one-dot chain line is formed on the illumination target surface. At the scanning position where the reflection type scanning body is rotated clockwise, the reflected parallel light L245 and the diffracted light L230 take an optical path indicated by a broken line, and the illumination area 250B indicated by a broken-line rectangle is formed on the illumination target surface (incidentally, the illustrated one-dot chain line or broken line is for convenience of explanation and do not indicate an accurate optical path of light).

In the illustrated example, the illumination areas 250A and 250B formed on the illumination target surface become an area having a shape in which the length in the longitudinal direction dl (Y axis direction) is larger than the length in the width direction dw (X axis direction). As described above, this is a consideration for presenting an illumination pattern having a more appropriate aspect ratio in a view seen from the driver.

When the light scanning part 245 performs periodical scanning, the illumination area 250 performs periodical movement, and for example, reciprocates between the illumination area 250A and the illumination area 250B illustrated in the drawing. In this case, when viewed from the driver, a state is observed in which the rectangular illumination area reciprocates left and right (X axis direction) in the illumination zone LZ (a rectangular zone including the illumination area 250A and the illumination area 250B) on the front road surface 10.

The collimating optical system 220 is a shaping optical system that shapes the divergent light L210 from the point light source 210 into the parallel light L220, and the front focal position of the collimating optical system 220 is arranged to coincide with the position (virtual image position) of the point light source 210. That is, the distance between the position (the diverging point of the diverging lens 216) of the point light source 210 and the collimating optical system 220 coincides with the focal length f of the collimating optical system 220. With such an arrangement, the collimating optical system 220 can emit the parallel light L220 with high parallelism, and a clear illumination area 250 with suppressed blurring can be formed.

In this way, the illumination device 204 according to the fourth embodiment illustrated in FIG. 14 adopts the same configuration as the illumination devices 200 to 203 described in § 4 except that a reflective type is used as the light scanning part 245. The basic operation thereof is the same as that of the illumination devices 200 to 203 described in § 4.

Figure 15:
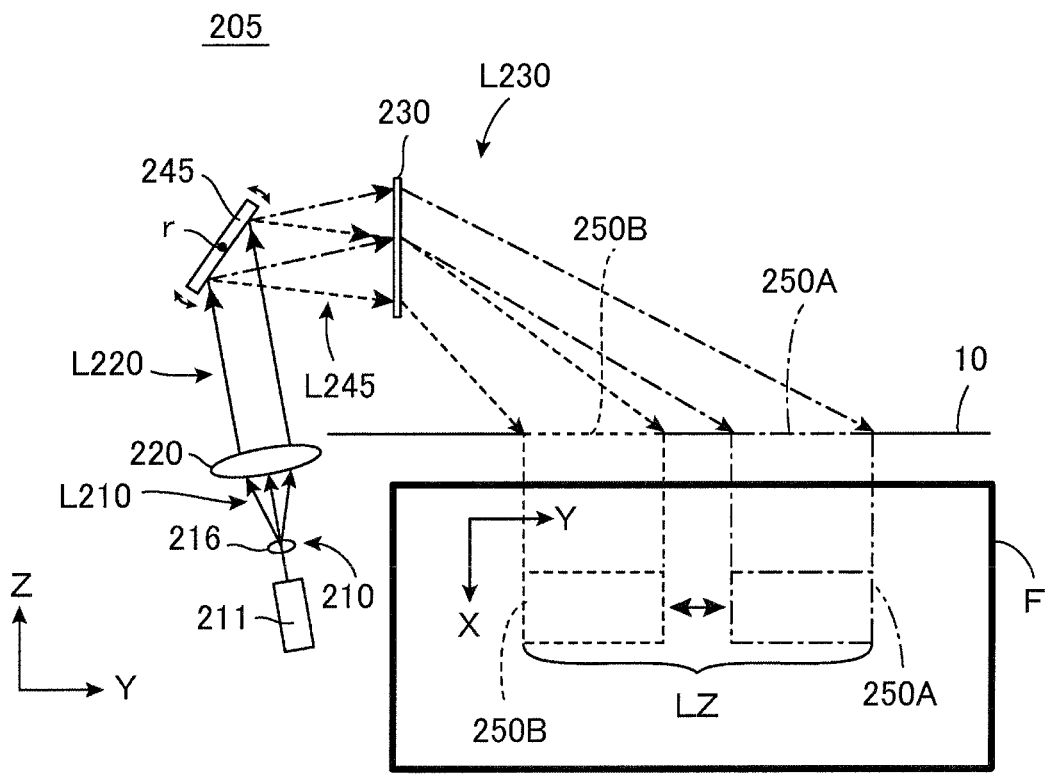
FIG. 15 is a side view (a top view in a thick frame F) illustrating Example 5 of the illumination device according to the second embodiment of the invention.

FIG. 15 is a side view (a top view in a thick frame F) illustrating Example 5 of the illumination device according to the second embodiment of the invention. The components of the illumination device 205 according to the fifth embodiment are basically the same as the components of the illumination device 204 illustrated in FIG. 14 described above. However, the arrangement of each component is slightly different. That is, while FIG. 14 is a top view (a view looking down on the XY plane) of the illumination device 204, FIG. 15 is a side view (a view with the YZ plane as a background) of the illumination device 205 (However, a thick frame F is a top view). Therefore, the arrangement of each component of the illumination device 205 with respect to the road surface 10 (XY plane) is different from the arrangement of each component of the illumination device 204 illustrated in FIG. 14, and the optical operation is also slightly different.

Specifically, while the light scanning part 245 of the illumination device 204 illustrated in FIG. 14 scans the reflected parallel light L245 in the X axis direction (the horizontal direction along the XY plane), the light scanning part 245 of the illumination device 205 illustrated in FIG. 15 scans the reflected parallel light L245 in the Z axis direction (the vertical direction along the YZ plane). In other words, the light scanning part 245 of the illumination device 205 illustrated in FIG. 15 rotates a reflection type scanning body (a plate-like member indicated by reference numeral 245 in the drawing) about the rotation axis r parallel to the X axis as a central axis.

Therefore, at the scanning position where the reflection type scanning body is rotated counterclockwise, the parallel reflected light L245 and the diffracted light L230 take an optical path indicated by a one-dot chain line, and the illumination area 250A indicated by a one-dot chain line is formed on the illumination target surface (the road surface 10 on the XY plane). At the scanning position where the reflection type scanning body is rotated clockwise, the parallel reflected light L245 and the diffracted light L230 take an optical path indicated by a broken line, and the illumination area 250B indicated by a broken line is formed on the illumination target surface (incidentally, the illustrated one-dot chain line or broken line is for convenience of explanation and do not indicate an accurate optical path of light).

The thick frame F in the drawing is a top view of the illumination target surface (road surface 10). As illustrated, the illumination area 250A indicated by a one-dot chain-line rectangle is formed far from the driver, and the illumination area 250B indicated by a broken-line rectangle is formed near the driver. Therefore, when the light scanning part 245 performs periodical scanning, the illumination area 250 performs periodical movement, and reciprocates between the illumination area 250A and the illumination area 250B illustrated in the drawing. Therefore, when viewed from the driver, a state is observed in which the rectangular illumination area reciprocates back and forth (Y axis direction) in the illumination zone LZ (a rectangular zone including the illumination area 250A and the illumination area 250B) on the front road surface 10.

Figure 16:
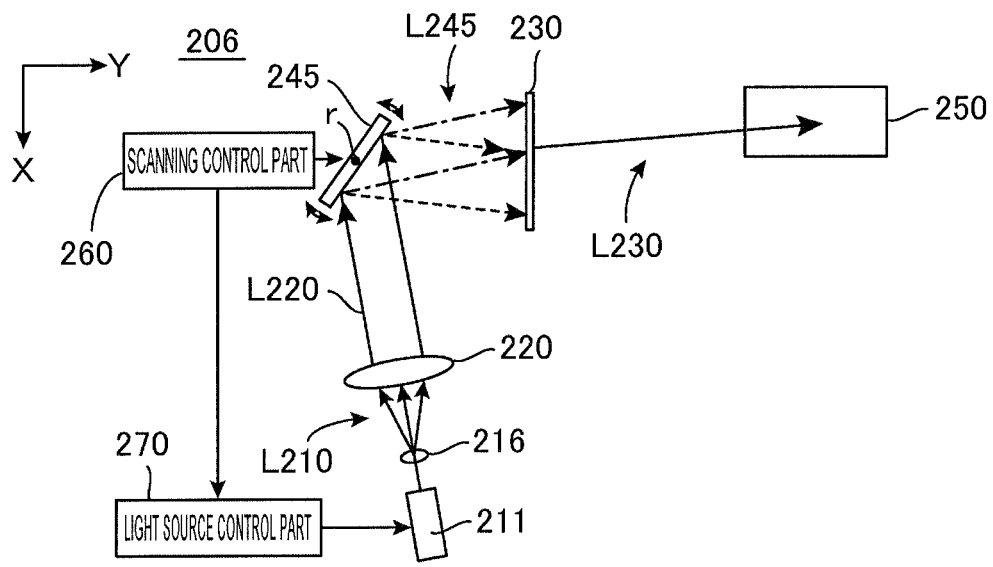
FIG. 16 is a top view (partly a block diagram) illustrating Example 6 of the illumination device according to the second embodiment of the invention.

FIG. 16 is a top view (partly a block diagram) illustrating Example 6 of the illumination device according to the second embodiment of the invention. An illumination device 206 according to the sixth embodiment is obtained by adding a scanning control part 260 and a light source control part 270 illustrated as blocks to the components of the illumination device 204 illustrated in FIG. 14.

Here, similarly to the scanning control part 160 illustrated in FIG. 12, the scanning control part 260 is a component having a function of controlling the scanning by the light scanning part 245, and similarly to the light source control part 170 illustrated in FIG. 12, the light source control part 270 is a component having a function of controlling turning on or off by the point light source generation part. The feature of the illumination device 206 is that the control of turning on or off the point light source by the light source control part 270 is performed in conjunction with the scan control by the scanning control part 260. The specific content of the interlocking control is the same as that of the illumination device 106 illustrated in FIG. 12, so the detailed description of the operation is omitted here.

Also in the illumination device 206, the turning on-or-off of the point light source is controlled by the cooperative operation of the scanning control part 260 and the light source control part 270, and the illumination area 250 can be formed only at a desired position. As described above, if the turning on-or-off of the point light source is controlled by the light source control part 270, not only the illumination area can be formed at an arbitrary position, but also the lighting time of the light source (for example, the laser light source 211) included in the point light source generation part can be shortened. Thus, power consumption can be reduced, and the life of the light source can be extended. Of course, similarly, the embodiment (on/off control mode) in which the turning on-or-off is controlled by such cooperative operation is also applicable to the other embodiments (for example, the embodiment using the transmission type light scanning part described in § 4).

Figure 17:
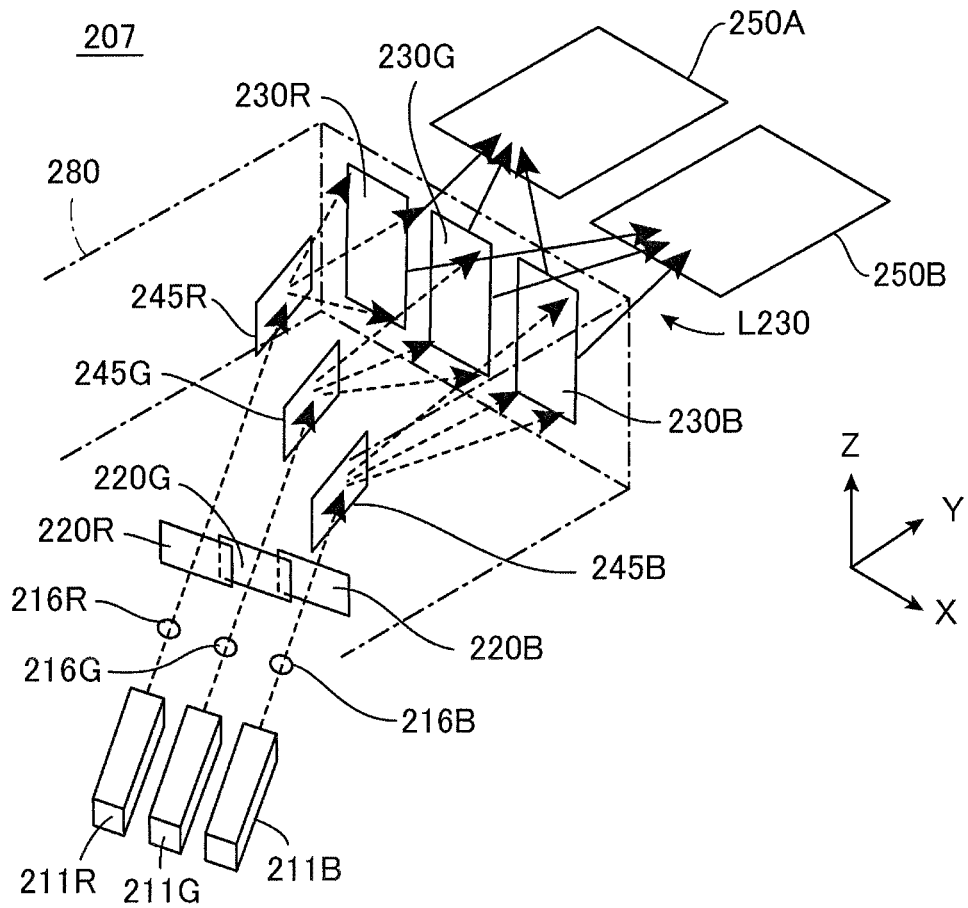
FIG. 17 is a perspective view illustrating Example 7 of the illumination device according to the second embodiment of the invention.

FIG. 17 is a perspective view illustrating Example 7 of the illumination device according to the second embodiment of the invention. The illumination device 207 according to the seventh embodiment is an illumination device having a function of performing color illumination, similarly to the illumination device 107 illustrated in FIG. 13. Specifically, the illumination device 207 illustrated in FIG. 17 can form an illumination area having a desired color by providing three sets of illumination devices 204 illustrated in FIG. 14.

Also in these illumination devices 207, among the three sets of illumination devices, a first illumination device is a device that performs red illumination, and in FIG. 17, each component of this first illumination device is indicated by adding R to the end of the reference numeral. Similarly, a second illumination device is a device that performs green illumination, and in FIG. 17, each component of this second illumination device is indicated by adding G to the end of the reference numeral. Further, a third illumination device is a device that performs blue illumination, and in FIG. 17, each component of this third illumination device is indicated by adding B to the end of the reference numeral.

The three sets of illumination devices are incorporated in the same device housing 280. Herein, the point light source generation part 211R of the first illumination device generates a red point light source, the point light source generation part 211G of the second illumination device generates a green point light source, and the point light source generation part 211B of the third illumination device generates a blue point light source. In practice, a laser light source for generating laser light of each color may be used.

The operation of each illumination device is the same as that of the illumination device 204 illustrated in FIG. 14, and thus the description thereof is omitted here. However, a diffractive optical element 230R of the first illumination device forms a red illumination area, a diffractive optical element 230G of the second illumination device forms a green illumination area, and a diffractive optical element 230B of the third illumination device forms a blue illumination area. Also in the case of the example illustrated in FIG. 17, the diffraction patterns recorded in the respective diffractive optical elements 230R, 230G, and 230B are adjusted such that the red illumination area, the green illumination area, and the blue illumination area are the same as one another, and the light scanning parts 245R, 245G, and 245B perform scanning in synchronization. For this reason, both the illumination area 250A formed at a certain scanning position and the illumination area 250B formed at another scanning position are a color illumination area in which the illumination areas of three colors overlap each other or an area illuminated by the composite color of three colors. The other points are the same as those of the illumination device 107 illustrated in FIG. 13.

In the illumination device 107 illustrated in FIG. 13, the light scanning parts 145R, 145G, and 145B perform scanning in the vertical direction (Z axis direction), and thus a state is observed in which the illumination area 150 has moved back and forth as seen from the driver. However, in the illumination device 207 illustrated in FIG. 17, the light scanning parts 245R, 245G, and 245B perform scanning in the horizontal direction (X axis direction), and thus a state is observed in which the illumination area 250 moves left and right as seen from the driver.

Therefore, in the illumination device 107 illustrated in FIG. 13, three sets of light scanning parts 145R, 145G, and 145B, three sets of collimating optical systems 120R, 120G, and 120B, and three sets of diffractive optical elements 130R, 130G, and 130B are arranged side by side in the vertical direction (Z axis direction). However, in the illumination device 207 illustrated in FIG. 17, three sets of collimating optical systems 220R, 220G, and 220B, three sets of light scanning parts 245R, 245G, and 245B, and three sets of diffractive optical elements 230R, 230G, and 230B are arranged side by side in the horizontal direction (X axis direction).

Figure 18:
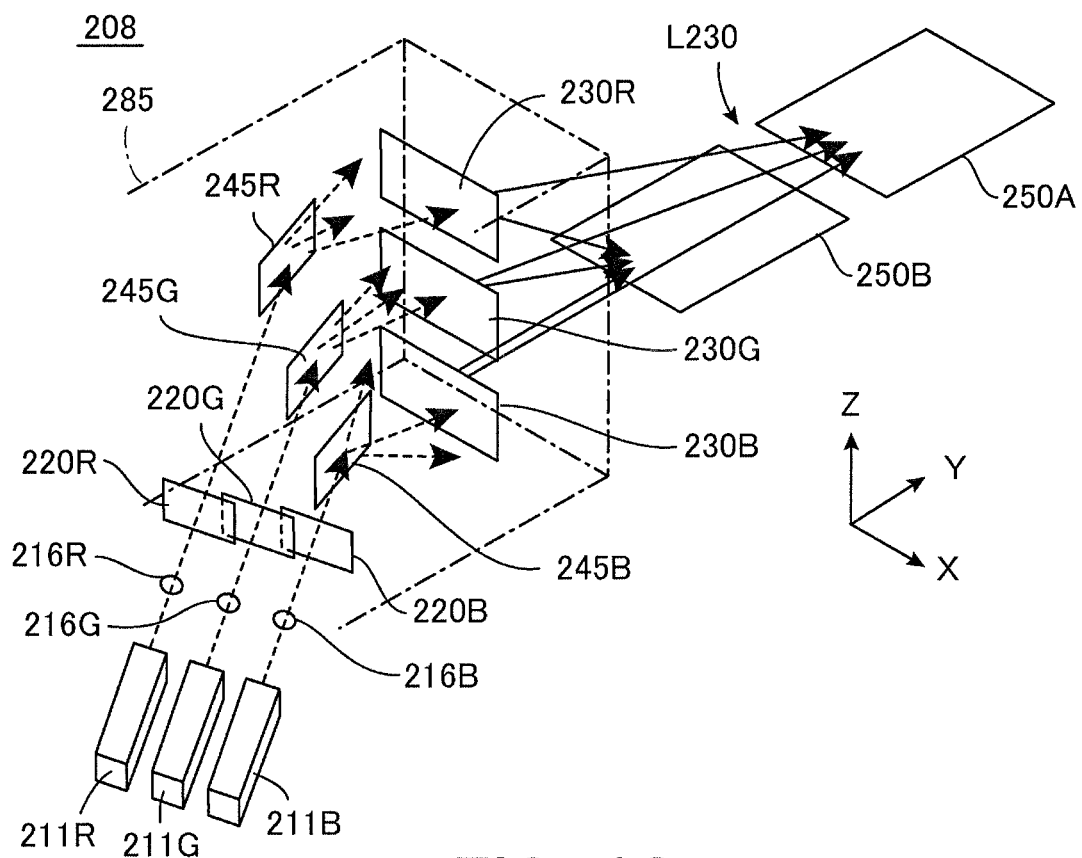
FIG. 18 is a perspective view illustrating Example 8 of the illumination device according to the second embodiment of the invention.

FIG. 18 is a perspective view illustrating Example 8 of the illumination device according to the second embodiment of the invention. Similarly with the illumination device 207 illustrated in FIG. 17, an illumination device 208 according to an eighth embodiment is an illumination device having a function of performing color illumination. In the illumination device 207 illustrated in FIG. 17, three sets of illumination devices 204 illustrated in FIG. 14 are provided, but in the illumination device 208 illustrated in FIG. 18, three sets of illumination devices 205 illustrated in FIG. 15 are provided. In the illumination device 208 illustrated in FIG. 18, the light scanning parts 245R, 245G, and 245B perform scanning in the vertical direction (the direction along the Z axis), and thus a state is observed in which the illumination area 250 moves forward and backward as seen from the driver.

In the illumination device 208 illustrated in FIG. 18, a vertically long device housing 285 is adopted. The three sets of collimating optical systems 220R, 220G, and 220B are arranged side by side in the horizontal direction (X axis direction), but the three sets of light scanning parts 245R, 245G, 245B and the three sets of diffractive optical elements 230R, 230G, 230B are arranged side by side in the vertical direction (Z axis direction).

Thus, there is a degree of freedom in the arrangement of each component when three sets of illumination devices are incorporated into one device housing. Therefore, for example, in the illumination device 207 illustrated in FIG. 17, three sets of diffractive optical elements 230R, 230G, and 230B can be arranged side by side in the vertical direction (Z axis direction), and in the illumination device 208 illustrated in FIG. 18, the three sets of diffractive optical elements 230R, 230G, and 230B can also be arranged side by side in the horizontal direction (X axis direction). In practice, an arrangement that is as efficient as possible may be employed. The same applies to the illumination device 107 illustrated in FIG. 13.

Also, the scanning direction by each of the light scanning parts 245R, 245G, and 245B can be set freely. For example, in the illumination device 207 illustrated in FIG. 17, the illumination area 250 can be moved in the Y axis direction by setting the scanning direction of each of the light scanning parts 245R, 245G, and 245B to the vertical direction (Z axis direction), and in the illumination device 208 illustrated in FIG. 18, the illumination area 250 can be moved in the X axis direction by setting the scanning direction of each of the light scanning parts 245R, 245G, and 245B to the horizontal direction (X axis direction). The same applies to the illumination device 107 illustrated in FIG. 13.

§ 7. Various Modifications

Here, various modifications that can be commonly applied to the respective examples of the first embodiment and the second embodiment described so far will be described.

7.1 Modification of Performing High-Speed Scanning

In each of the embodiments described above, an example has been described in which the illumination area formed on the illumination target surface is moved by the scanning of the light scanning part. However, when the scanning of the light scanning part is accelerated, to the human eye, the moving illumination areas appear to be continuous, and the entire larger area appears to be illuminated. For example, in the illumination device 205 illustrated in FIG. 15, when the periodic scanning is performed by the light scanning part 245, the illumination area 250 reciprocates in the Y axis direction on the illumination target surface. If the illumination areas located at both ends of this reciprocating motion are the illumination area 250A and the illumination area 250B as illustrated, and the rectangular areas including the illumination areas 250A and 250B at both ends are referred to as the illumination zone LZ, the illumination area 250 reciprocates in the illumination zone LZ.

However, when the periodic scanning by the light scanning part 245 is sped up, from the human eye, the moving illumination areas appear to be continuous, and the entire illumination zone LZ appears to be illuminated at the same time. As described above, by performing high-speed scanning by the light scanning part, the illumination device according to the invention can give an effect of illuminating the entire illumination zone LZ formed as an aggregate area of a plurality of illumination areas.

Figure 19:
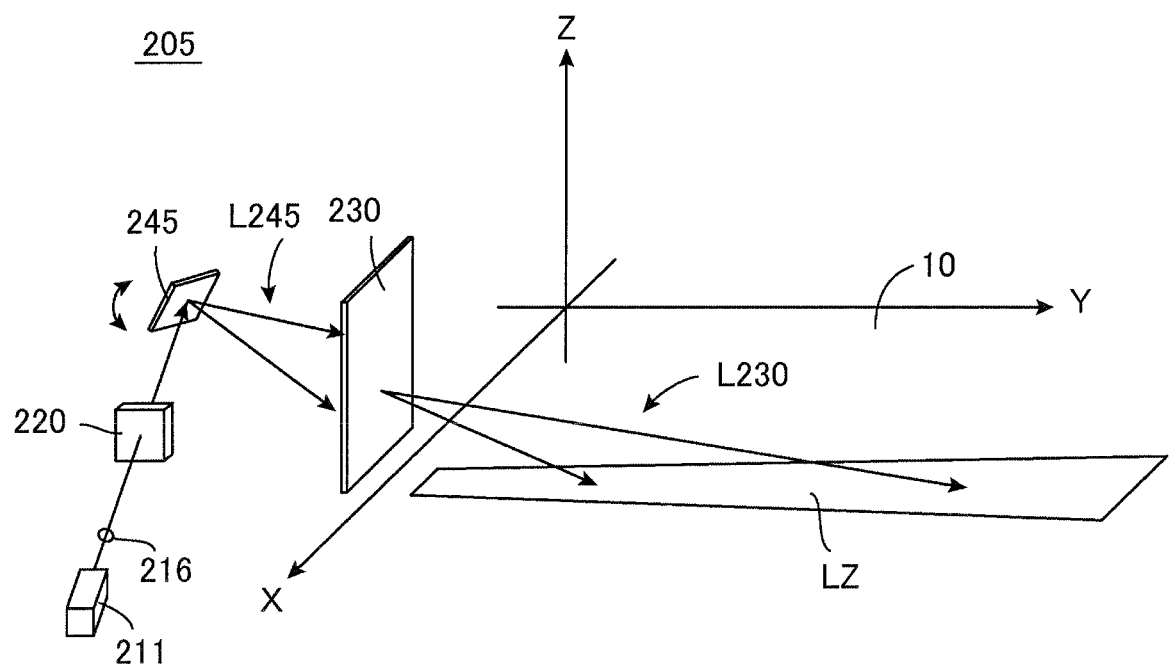
FIG. 19 is a perspective view illustrating a state where an elongated illumination zone LZ is formed by the illumination device according to the invention.

FIG. 19 is a perspective view illustrating a state where an elongated illumination zone LZ is formed by the illumination device according to the invention. FIG. 19 illustrates a state in which the illumination device 205 illustrated in FIG. 15 is arranged such that the diffractive optical element 230 is on the XZ plane. The rotation axis r of the light scanning part 245 is an axis parallel to the X axis, and the reflected parallel light L245 reflected by the light scanning part 245 is scanned in the vertical direction. Therefore, on the road surface 10 (XY plane) set as the illumination target surface, as indicated in the thick frame F of FIG. 15, the rectangular illumination area 250 reciprocates in the Y axis direction, but when the scanning by the light scanning part 245 is accelerated, it appears from the human eye that a single illumination zone LZ elongated in the Y axis direction is illuminated as illustrated in FIG. 19.

Incidentally, in FIG. 19, this illumination zone LZ is drawn exaggeratedly as an elongated trapezoidal area. Since the diffracted light L230 travels while spreading, FIG. 19 illustrates a result is obtained by deforming an aspect in which the lateral width (the width in the X axis direction) of the illumination zone LZ increases as the light goes farther. For example, such an illumination function is a function which is preferable when the illumination device 205 is used as a search light for a vehicle.

In short, when the aggregate area of a plurality of different illumination areas formed on the illumination target surface 10 is referred to as called the illumination zone LZ, the modification illustrated in FIG. 19 can be said as an example in which the light scanning part 245 performs scanning at a speed where the illumination zone LZ is visually recognized as a single area by the human eye.

7.2 Modification of Method of Creating Diffraction Pattern

In § 2, an example has been described in which a hologram element created by the method illustrated in FIG. 3(b) is used as the diffractive optical element 130 illustrated in FIG. 3(a). Moreover, a point has been also described in which the CGH obtained by computer calculation is used for the diffraction pattern (interference fringe) recorded on such a hologram element. However, the diffractive optical element 130 used in the illumination device according to the invention can be created by various methods, and even when the CGH is used, the optical phenomenon illustrated in FIG. 3(b) is not necessarily simulated on a computer.

Figure 20:
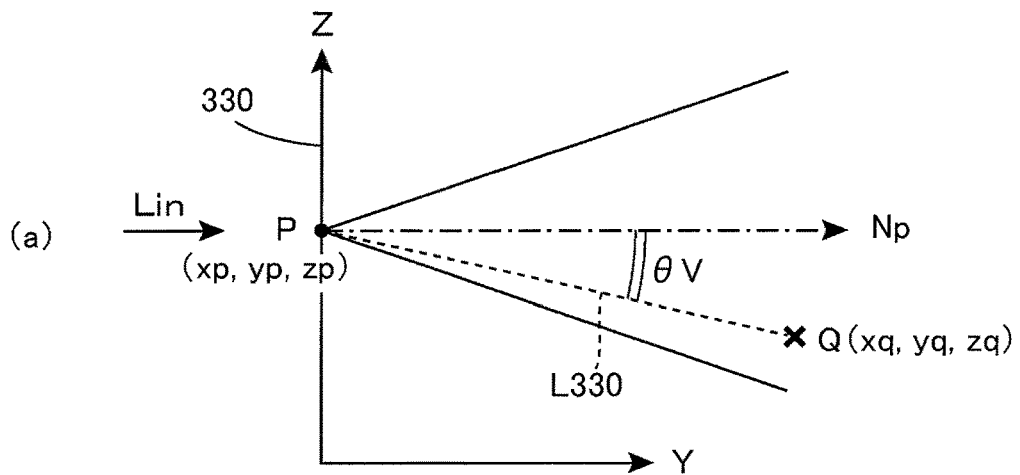
FIG. 20 is a view illustrating a method of expressing an angular space distribution of primary diffracted light intensity emitted from one point P on a diffractive optical element 330 using displacement angles θV and θH.
Figure 20:
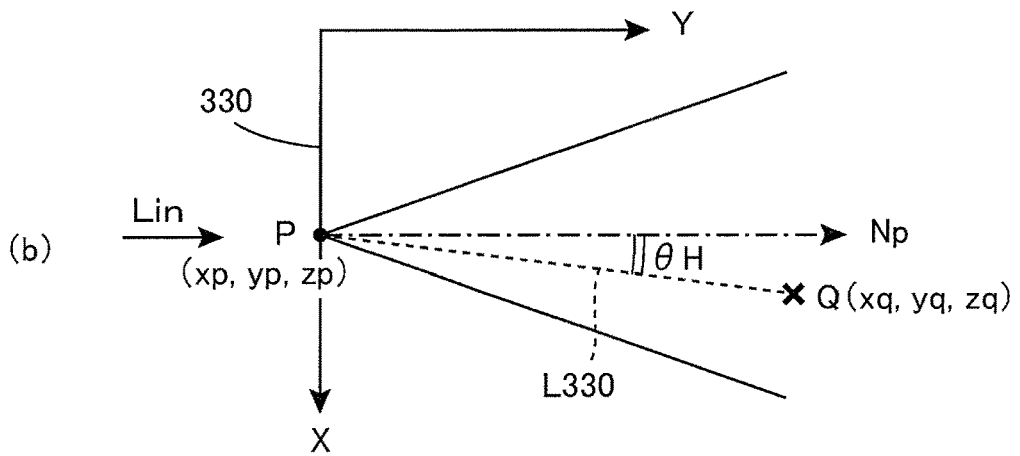
Figure 20:
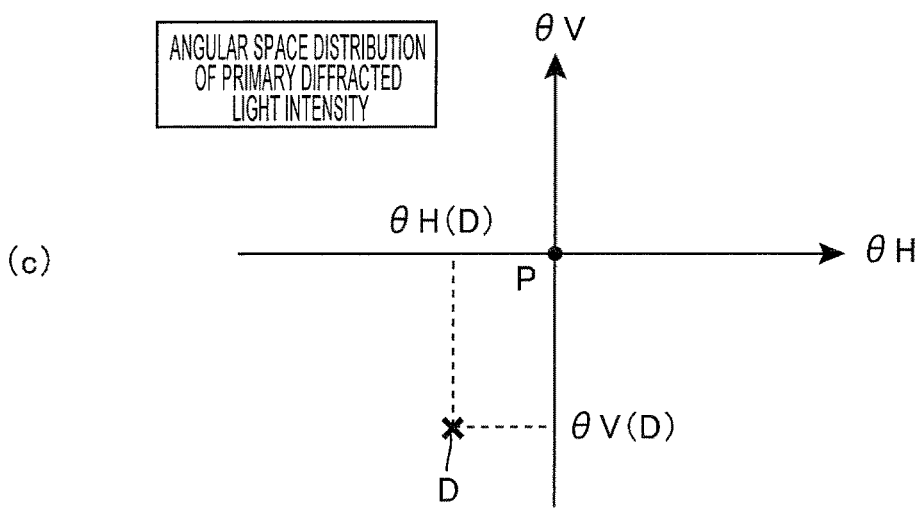

FIG. 20 is a view illustrating a method of expressing an angular space distribution of primary diffracted light intensity emitted from one point P on a diffractive optical element 330 using displacement angles θV and θH. Here, the direction of the diffracted light L330 is considered which is emitted from one point P (xp, yp, zp) on the diffractive surface located at the coordinates (xp, yp, zp) in a case where the diffractive surface of the diffractive optical element 330 is arranged on the XZ plane, and incident light Lin is given at a predetermined incident angle.

FIG. 20(a) is a side view of the XYZ three-dimensional orthogonal coordinate system, and corresponds to a drawing in which the optical path (broken line) of the primary diffracted light L330 emitted from the point P is projected on the YZ plane when the incident light Lin is given to the point P from a predetermined direction. The right side of the drawing is the positive direction of the Y axis, and the upper side of the drawing is the positive direction of the Z axis. The drawing illustrates a aspect in which that the primary diffracted light L330 (broken line) emitted from the point P is directed to an arbitrary point Q (xq, yq, zq) in the space. In the case of the illustrated example, the primary diffracted light L330 is emitted in a direction that forms a vertical displacement angle θV with respect to a normal Np (parallel to the Y axis) made at the point P.

The angle range sandwiched by the solid lines in the drawing indicates the diffusion angle space to which the primary diffracted light is directed from the point P. That is, in practice, a predetermined diffraction pattern (interference fringe) is formed in a region around point P, and the first-order diffracted light diffracted by the diffraction pattern near point P includes many diffracted lights traveling in the diffusion angle space sandwiched by solid lines in the drawing as well as the diffracted light L330 illustrated in the drawing. Therefore, the primary diffracted light diffracted by the diffraction pattern near the point P travels the optical path in the diffusion angle space to form a predetermined illumination target area on the illumination target surface.

On the other hand, FIG. 20(b) is a top view of the XYZ three-dimensional orthogonal coordinate system and corresponds to a drawing in which the optical path (broken line) of the primary diffracted light L330 emitted from point P is projected on the XY plane when the incident light Lin is given to point P from a predetermined direction. The right side of the drawing is the positive direction of the Y axis, and the lower side of the drawing is the positive direction of the X axis. This drawing also illustrates an aspect in which the primary diffracted light L330 (broken line) emitted from the point P is directed to an arbitrary point Q (xq, yq, zq) on the space. In the illustrated example, the primary diffracted light L330 is emitted in a direction that makes a horizontal displacement angle θH with respect to a normal Np (parallel to the Y axis) made at the point P. Also in this drawing, the angle range sandwiched by the solid line indicates the diffusion angle space to which the primary diffracted light diffracted by the diffraction pattern near point P is directed, and the primary diffracted light travels along an optical path in this diffusion angle space to form a predetermined illumination area on the illumination target surface.

As described above, the traveling direction (diffraction direction) of one diffracted light L330 emitted from any one point P of the diffractive optical element 330 can be expressed by two sets of angles which are the vertical displacement angle θV and the horizontal displacement angle θH. That is, the direction of the diffracted light from the point P (xp, yp, zp) to the point Q (xq, yq, zq) can be expressed by two sets of angles (θV, θH).

Since the direction of the primary diffracted light directed from the point P to various directions can be expressed by two sets of angles (θV, θH), as illustrated in FIG. 20(c), the direction of the primary diffracted light emitted from a certain point P can be indicated by the position coordinates of the distribution point D on the angular space distribution expressed by the two-dimensional orthogonal coordinate system θV-θH. Therefore, a predetermined intensity determined for each distribution point D on the two-dimensional orthogonal coordinate system θV-θH becomes information which indicates the angular space distribution of the primary diffracted light intensities diffracted by the diffraction pattern near the point P, and this is information indicating the diffraction characteristics of the diffraction pattern near the point P.

Figure 21:
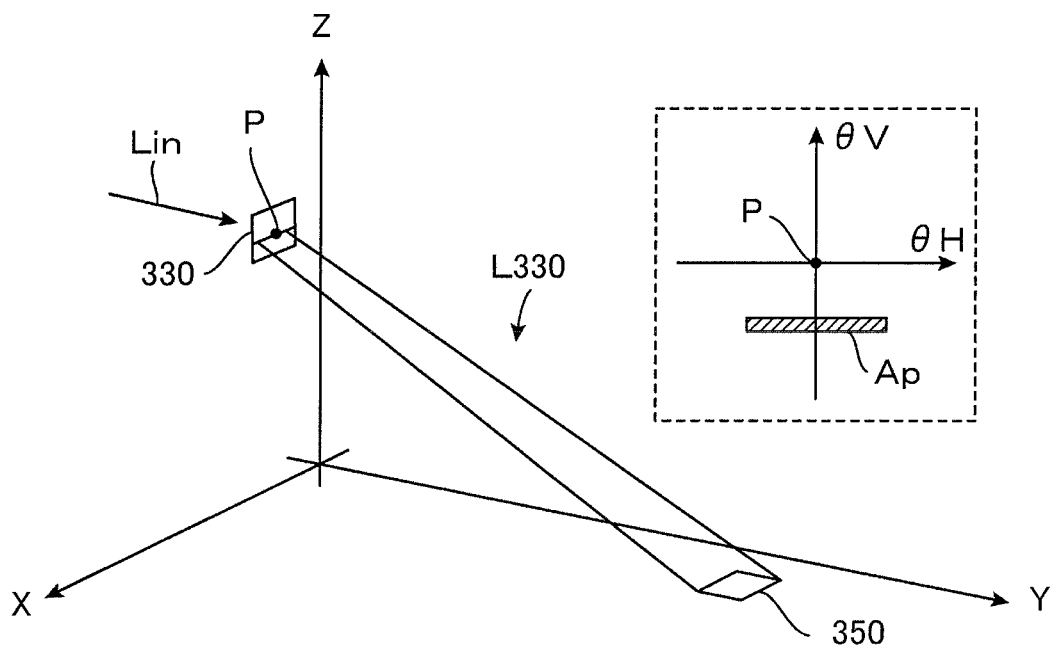
FIG. 21 is a perspective view (a broken-line frame is an angular space distribution diagram) illustrating a principle in which an illumination area 350 is formed by diffracted light L330 from the diffractive optical element 330 in the illumination device according to the invention.

FIG. 21 is a perspective view (a broken-line frame is an angular space distribution diagram) illustrating a principle in which an illumination area 350 is formed by the diffracted light L330 from the diffractive optical element 330 in the illumination device according to the invention. In this drawing, the diffractive surface of the diffractive optical element 330 is arranged in the XZ plane, and the illumination target surface is set in the XY plane. The angular space distribution diagram indicated by the broken-line frame is the distribution diagram described in FIG. 20(c) and indicates the angular space distribution of the primary diffracted light intensity diffracted by the diffraction pattern near the point P when the incident light Lin is given at a predetermined incident angle to the vicinity of one point P on the diffractive optical element 330 (a predetermined primary diffracted light intensity value is defined at each position of the distribution diagram).

Here, it is assumed that an elongated rectangular area Ap indicated by hatching in the drawing is defined as the angular space distribution area of the diffused light from the vicinity of the point P. For example, it is assumed that predetermined primary diffracted light intensity values are defined at respective points inside rectangular are Ap, and 0 is defined as the primary diffracted light intensity value at each point outside the rectangular are Ap. In this case, when the incident light Lin is given to the diffractive optical element 330 at the predetermined incident angle, the diffracted light is emitted from the vicinity of the point P in a direction corresponding to the coordinate value (θV, θH) of each point in the rectangular area Ap.

In the case of the illustrated example, the rectangular area Ap is an area having a predetermined width in which the vertical displacement angle θV is negative, and the horizontal displacement angle θH is positive and negative with 0 as a center. Thus, as illustrated, the diffracted light L330 emitted from the vicinity of the point P becomes light having a predetermined width downward and illuminates the rectangular illumination area 350.

After all, in order to design the diffractive optical element 330 having a function of forming the desired illumination area 350 on the illumination target surface when the incident light Lin is given at a predetermined incident angle, first, the angular space distribution diagram illustrated in the dotted line frame of 21 is created with respect to the point P, and the incident light Lin incident at a predetermined incident angle is set. On the basis of this angular space distribution diagram, the diffraction pattern (interference fringes) to be formed near the point P may be obtained by calculation. Of course, in practice, a large number of representative points P may be set on the diffractive optical element 330, and the diffraction pattern may be determined by the above-described method for the vicinity of each of the respective representative points P. Thus, since the method of calculating the diffraction pattern on the basis of the angular space distribution diagram is a known method as a method of creating a CGH, detailed description will be omitted here.

In the case of a vehicle-mounted illumination device illustrated in FIG. 2, as illustrated in FIG. 21, the diffractive optical element 330 is created from which the angular space distribution diagram in which the vertical displacement angle θV is negative is obtained, and the illumination area 350 is formed on the road surface with the diffracted light obliquely downward. In this case, as an angle between the traveling direction of the diffracted light L330 and the normal direction (the Z axis direction in the illustrated example) of the projection plane (illumination target surface: the XY plane in the illustrated example) is larger, that is, as the illumination area 350 is formed farther, the illumination area 350 is extended further in the Y axis direction.

Therefore, practically, the diffraction pattern is preferably recorded such that an angular space distribution area is obtained in which the width in the vertical displacement angle θV is smaller than the width in the horizontal displacement angle θH as in the rectangular are Ap illustrated in the angular space distribution diagram in the broken-line frame in FIG. 21. Then, since the projected diffracted light is expanded in the Y axis direction, as illustrated in FIG. 21, it is possible to form the rectangular illumination area 350 having a small aspect ratio.

Thus, the shape of the formed illumination area 350 can be changed by adjusting the angle between the traveling direction of the diffracted light L330 from the diffractive optical element 330 and the normal direction of the projection surface (illumination target surface). In order to adjust the angle between the traveling direction of the diffracted light L330 from the diffractive optical element 330 and the normal direction of the projection surface (illumination target surface), for example, the incident angle of the incident light Lin given to the diffractive optical element 330 may be adjusted by the light scanning by the light scanning part, or the diffraction characteristic may be set to a desired characteristic in advance when the diffractive optical element 330 is designed.

7.3 Modification of Two-Dimensional Scanning

In all the embodiments described so far, scanning is performed one-dimensionally by the light scanning part, and the direction of the light emitted from the light scanning part is changed to one direction. However, the light scanning part used in the invention may have a function of performing scanning while rotating the transmission type scanning body or the reflection type scanning body about at least one axis and changing the light direction to at least one direction. Thus, it is possible to perform two-dimensional scanning.

Figure 22:
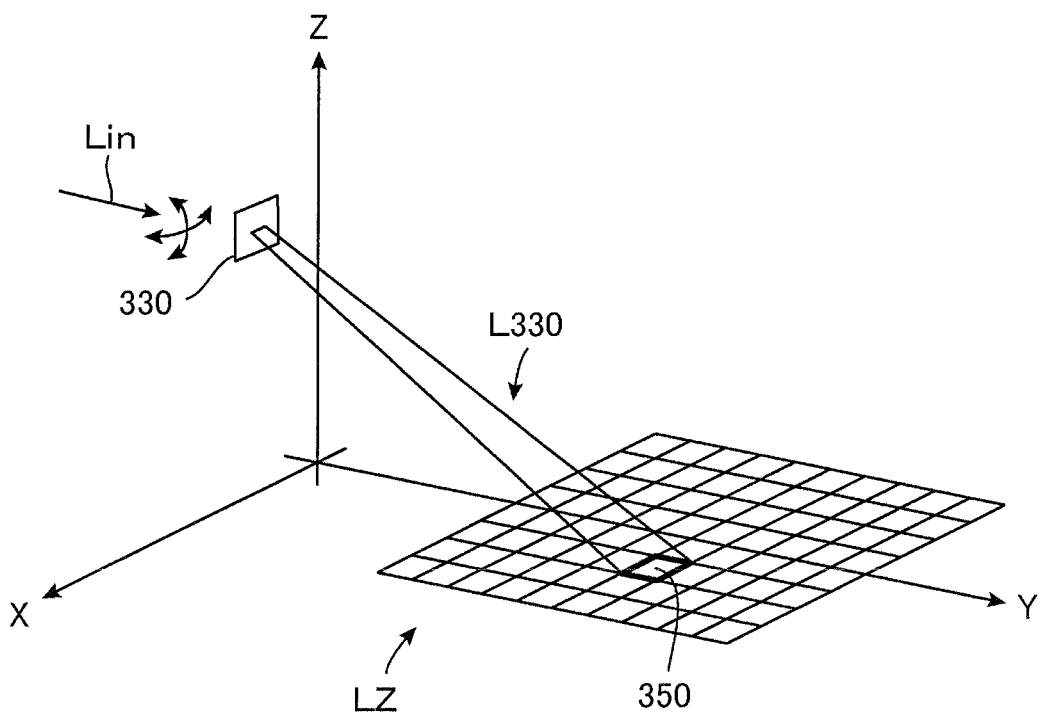
FIG. 22 is a perspective view illustrating a state in which the illumination zone LZ having a two-dimensional spread is formed by performing a two-dimensional scan in the illumination device according to the invention.

FIG. 22 is a perspective view illustrating a state in which the illumination zone LZ having a two-dimensional spread is formed by performing a two-dimensional scan in the illumination device according to the invention. That is, in the case of this illumination device, the light scanning part (not illustrated in FIG. 22) has a function of two-dimensionally scanning light by emitting the light while changing the direction of incident light with respect to two orthogonal directions and can change the position of illumination area 350 formed on the illumination target surface (XY plane) two-dimensionally.

FIG. 22 illustrates a state where the incident light Lin is emitted at a predetermined incident angle to the diffractive optical element 330 arranged on the XZ plane, and the illumination area 350 (a rectangular area indicated by a bold line frame) is formed on the XY plane by the diffracted light L330. Here, when light is scanned in two directions of the X axis direction and the Z axis direction by the light scanning part, the direction of the incident light Lin also changes in the two directions of the X axis direction and the Z axis direction. When the direction of the incident light Lin is changed in the X axis direction, the illumination area moves in the X axis direction as in the example illustrated in FIG. 10, for example. When the direction of the incident light Lin is changed in the Z axis direction, the illumination area moves in the Y axis direction as in the example illustrated in 11, for example. Therefore, when the direction of the incident light Lin is changed into two directions of the X axis direction and the Z axis direction, as illustrated in FIG. 22, the illumination area 350 moves in two directions of the X axis direction and the Y axis direction.

In FIG. 22, for convenience of explanation, the illumination area 350 moving in such a two-dimensional manner is indicated by rectangles arranged vertically and horizontally in a grid shape. Each rectangle corresponds to an individual illumination area formed when incident light Lin is incident on the diffractive optical element 330 at a specific incident angle. However, in practice, the illumination area 350 moves continuously in the X axis direction and the Y axis direction, and the two-dimensional spread illumination zone LZ is formed as a whole. The illumination area 350 moves two-dimensionally within this illumination zone LZ. Incidentally, similarly with the embodiment illustrated in FIG. 19, the diffracted light spreads as the light goes farther, and thus in practice, the illumination zone LZ is not rectangular but trapezoidal.

Here, if the scanning amount in the X axis direction and the scanning amount in the Y axis direction can be controlled independently, the illumination area 350 can be brought to an arbitrary position in the illumination zone LZ. Therefore, if the on/off control mode as illustrated in FIGS. 12 and 16 is adopted, it is possible to illuminate only an arbitrary position in the illumination zone LZ. For example, among the illumination areas indicated by a plurality of rectangles arranged in a grid in FIG. 22, only an arbitrary illumination area can be illuminated. Of course, as described in § 7.1, if the light scanning part performs high-speed scanning, it is possible for a human to visually recognize the illumination zone LZ as a single region.

7.4 Modification Using Element Diffractive Optical Element

Figure 23:
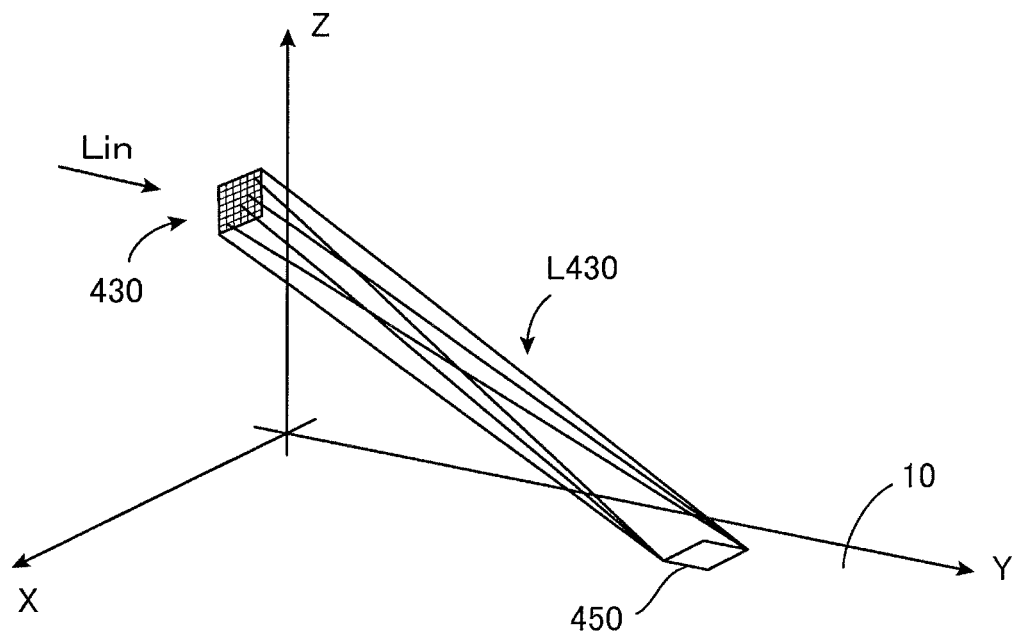
FIG. 23 is a perspective view illustrating an example in which an illumination area 450 is formed using an element diffractive optical element 430 in the illumination device according to the invention.

FIG. 23 is a perspective view illustrating an example in which an illumination area 450 is formed using an element diffractive optical element 430 in the illumination device according to the invention. The element diffractive optical element 430 has a plurality of element diffractive optical parts (in the drawing, small rectangular groups obtained by dividing the element diffractive optical element 430). Here, each of the individual element diffractive optical parts has a function of forming the same illumination area 450 on the illumination plane 10 (the XY plane in the illustrated example) on the basis of the parallel incident light Lin incident at a preset common reference angle (a reference angle commonly set for all the element diffractive optical parts).

Figure 24:
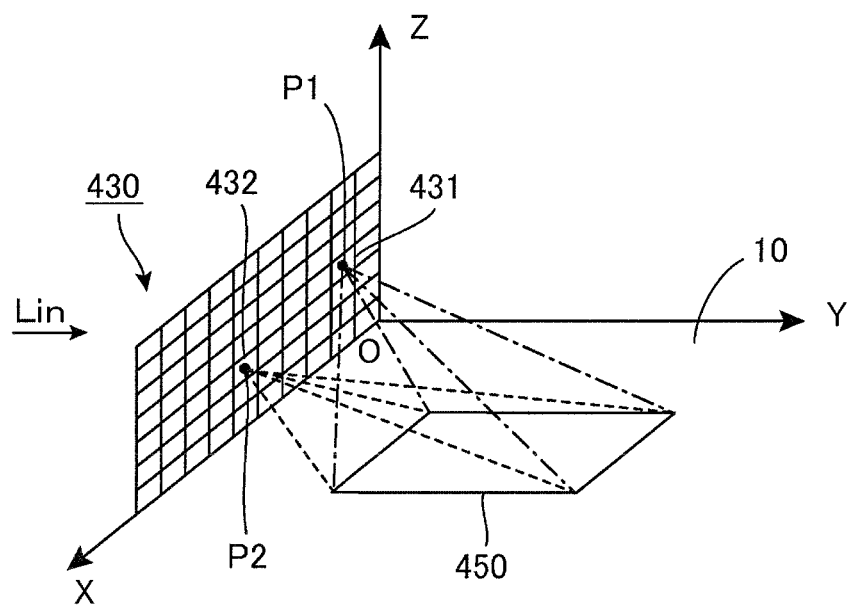
FIG. 24 is an enlarged perspective view illustrating a diffraction aspect of an element diffractive optical element 430 illustrated in FIG. 23.

FIG. 24 is an enlarged perspective view illustrating a diffraction aspect of the element diffractive optical element 430 illustrated in FIG. 23. For convenience of explanation, a state is illustrated in which the lower right corner of the element diffractive optical element 430 is arranged at the position of the origin O of the coordinate system. In this example, the element diffractive optical element 430 includes a plurality of element diffractive optical parts 431, 432, and so on which are arranged in a two-dimensional matrix on a predetermined arrangement plane (in this example, the XZ plane). Then, as illustrated in the drawing, when the parallel incident light Lin is given from a predetermined direction (in the case of the illustrated example, the negative direction of the Y axis), all the individual element diffractive optical parts form the same illumination area 450 on the illumination target surface 10 (XY plane).

For example, the diffracted light indicated by a one-dot chain line in the drawing is emitted from the element diffractive optical part 431, and the illumination area 450 is formed by the diffracted light. Similarly, the diffracted light indicated by the broken line in the drawing is emitted from the element diffractive optical part 432, and the illumination area 450 is formed by the diffracted light. The same illumination area 450 is formed also by the diffracted light from other element diffractive optical parts. Incidentally, in the drawing, for the convenience of description, a state is illustrated in which diffracted light is emitted from the representative point P1 of the element diffractive optical part 431 and the representative point P2 of the element diffractive optical part 432. However, in practice, a diffraction phenomenon occurs due to the entire diffraction pattern (interference fringes) formed in the element diffractive optical parts 431 and 432, and the diffracted light is emitted from the entire surface of the element diffractive optical parts 431 and 432.

In this case, the diffracted light from the element diffractive optical parts 431 and 432 at different positions needs to form the same illumination area 450, and thus the element diffractive optical parts 431 and 432 need to form diffraction patterns different from each other. Therefore, when the element diffractive optical element 430 is created, it is necessary to separately and independently create a diffraction pattern (interference fringe) for each of the element diffractive optical parts 431, 432, and so on.

For example, in the case of creating the element diffractive optical element 430 as the CGH created using a computer, the processing that the diffraction pattern necessary for forming the illumination area 450 is obtained by calculation in the element diffractive optical part 431, subsequently the diffraction pattern necessary to form the illumination area 450 is obtained by calculation in the element diffractive optical part 432, and so on is performed for all the element diffractive optical parts. By arranging a large number of obtained diffraction patterns for the element diffractive optical parts in a two-dimensional matrix, the diffraction pattern of the entire element diffractive optical element 430 is obtained.

The diffraction pattern of the entire element diffractive optical element 430 obtained by such arithmetic processing is different from the diffraction pattern obtained by an ordinary method in which the element diffractive optical part is not provided, and there is an effect of suppressing blurring of a projected image (illumination area 450) on the illumination target surface to make the projected image clearer. The reason is considered that in the case of the ordinary diffractive optical element, the illumination area 450 is formed by diffracted light from the entire diffraction pattern formed on the entire element surface while in the case of the element diffractive optical element 430, the illumination area 450 is formed by an aggregate of independent individual illumination patterns obtained by the diffracted lights from the element diffractive optical part 131, 132, and so on.

In the case of the illumination device according to the invention, a method of changing the incident angle of the parallel incident light Lin to the diffractive optical element is adopted in order to move the illumination area. When the change of the incident angle becomes large, blurring is more likely to occur in the formed illumination area. Therefore, as described so far, according to the invention, the divergent light from the a point light source is shaped and collimated by the collimating optical system to generate parallel light with high parallelism, thereby eliminating blurring on the illumination area. However, in a case where the invention is applied to a vehicle-mounted illumination device as illustrated in FIG. 2, blurring of the illumination area is more likely to occur when projection is performed far. When the element diffractive optical element is used as the diffractive optical element as in the example illustrated in FIG. 24, it is effective in further suppressing blurring to form an illumination area with high resolution.

Incidentally, as illustrated in FIG. 24, the individual element diffractive optical parts 431, 432, and so on configuring the element diffractive optical element 430 have a function of forming the same illumination area 450 when the incident light Lin is incident at a predetermined reference angle set in advance. Thus, there is a possibility that when the incident angle of the incident light Lin changes significantly, the illumination areas formed by the individual element diffractive optical parts 431, 432, and so on are deviated from each other. In order to suppress such a deviation, the change amount of the incident angle of the incident light Lin (the scanning amount of the light scanning part) may be limited. Of course, there is a case where there is no problem in some contents of the information presented to the driver or the like even when a deviation occurs in the illumination area. Thus, in such a case, the deviation may occur in the illumination area.

7.5 Modification with Diffractive Optical Element Omitted

All the embodiments described so far relate to the illumination device having the diffractive optical element as an essential component. That is, the illumination device described so far includes, as essential components, the point light source generation part for generating a point light source, the diffractive optical element that diffracts parallel light incident at a predetermined incident angle and forms the illumination area on a predetermined illumination surface by the generated diffracted light, the collimating optical system that shapes divergent light from the point light source into parallel light, and the light scanning part that scans light by emitting the incident light while changing the direction of the light.

The point light source, the light scanning part, the collimating optical system, and the diffractive optical element are arranged such that the divergent light from the point light source is incident on the diffractive optical element from one of the light scanning part and the collimating optical system through the other. Further, the collimating optical system is arranged such that the front focal position thereof coincides with the position of the point light source at least when the light scanning part is at a predetermined reference scanning position and is configured such that the incident angle of the parallel light incident on the diffractive optical element is changed by the scanning of the light scanning part. The modification described here is obtained by removing the diffractive optical element from the illumination device according to the embodiments described so far to simplify the structure.

Figure 25:
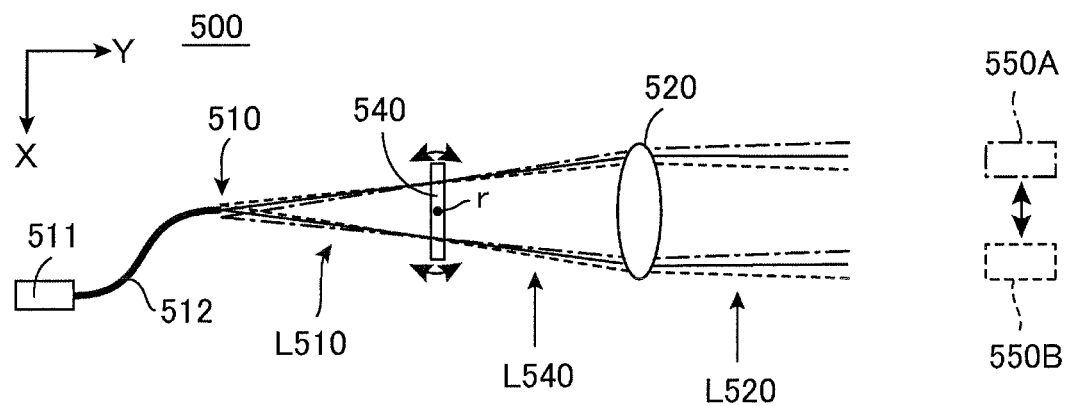
FIG. 25 is a top view illustrating a basic configuration of an illumination device 500 according to a modification in which the diffractive optical element is omitted from the first embodiment of the invention.

FIG. 25 is a top view illustrating a basic configuration of an illumination device 500 according to a modification in which the diffractive optical element is omitted from the first embodiment of the invention. The illumination device 500 corresponds to an illumination device obtained by removing the diffractive optical element 130 from the illumination device 101 illustrated in FIG. 6(*a*). That is, the illumination device 500 includes point light source generation parts (a laser light source 511 and an optical fiber 512) that generate a point light source 510, a light scanning part 540 that scans divergent light L510 from the point light source 510 in at least one direction by changing the direction of the divergent light L510, and a collimating optical system 520 that shapes light L540 scanned by the light scanning part 540 into parallel light L520. In the case of the illustrated example, the light scanning part 540 includes a scanning body that rotates about the rotation axis r as a central axis, and scans the divergent light L510 in one direction.

Here, the collimating optical system 520 is arranged such that the front focal position thereof coincides with the position (virtual image position in the case of the reflection type) of the point light source 510 at least when the light scanning part 540 is at a predetermined reference scanning position. With such a configuration, the illumination device 500 has a function of illuminating in different directions by the scanning of the light scanning part 540. Therefore, when the light scanning part 540 performs scanning, the illumination area 550 moving between an illumination area 550A and an illumination area 550B is formed on the illumination target surface. Specifically, the light from the point light source 510 changes with time so as to illuminate the illumination target surface through light paths drawn by solid lines, one-dot chain lines, or broken lines in the drawing by the scanning of the light scanning part 540. Incidentally, in FIG. 25, each component indicated by the reference numeral 500 is substantially the same as each corresponding component indicated by the reference numeral 100 in FIG. 6(*a*). Thus, the detailed description about each component is omitted here.

Figure 26:
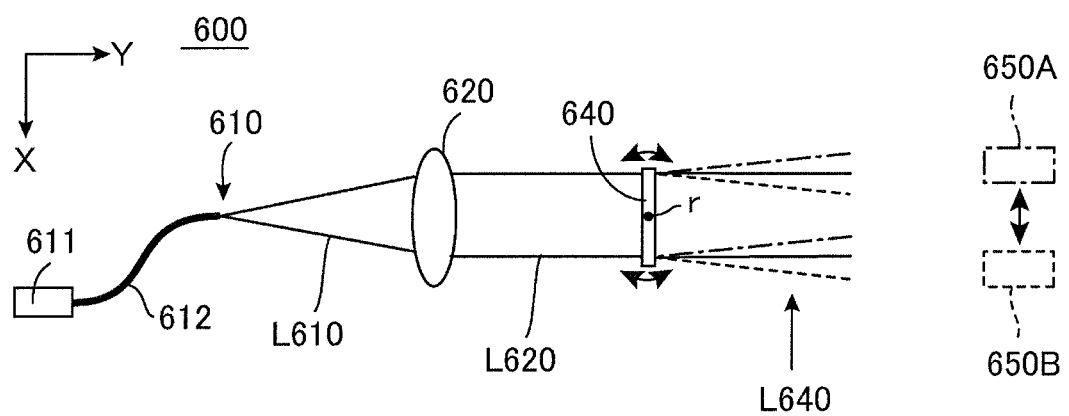
FIG. 26 is a top view illustrating a basic configuration of an illumination device 600 according to a modification in which the diffractive optical element is omitted from the second embodiment of the invention.

On the other hand, FIG. 26 is a top view illustrating a basic configuration of an illumination device 600 according to a modification in which the diffractive optical element is omitted from the second embodiment of the invention. The illumination device 600 corresponds to an illumination device obtained by removing the diffractive optical element 230 from the illumination device 201 illustrated in FIG. 9(*a*). That is, the illumination device 600 includes point light source generation parts (a laser light source 611 and an optical fiber 612) that generate a point light source 610, a collimating optical system 620 that shapes divergent light L610 from a point light source 610 into parallel light L620, and a light scanning part 640 that scans parallel light L620 in at least one direction by changing the direction of the parallel light L620. In the case of the illustrated example, the light scanning part 640 includes a scanning body that rotates about the rotation axis r as a central axis, and scans the parallel light L620 in one direction.

Here, the collimating optical system 620 is arranged such that the front focal position thereof coincides with the position of the point light source 610 at least when the light scanning part 640 is at a predetermined reference scanning position. With such a configuration, the illumination device 600 has a function of illuminating in different directions by the scanning of the light scanning part 640. Therefore, when the light scanning part 640 performs scanning, an illumination area 650 moving between an illumination area 650A and an illumination area 650B is formed on the illumination target surface. Specifically, the light from the point light source 610 changes with time so as to illuminate the illumination target surface through light paths drawn by solid lines, one-dot chain lines, or broken lines in the drawing by the scanning of the light scanning part 640. Incidentally, in FIG. 26, each component indicated by the reference numeral 600 is substantially the same as each corresponding component indicated by the reference numeral 200 in FIG. 9(*a*). Thus, the detailed description about each component is omitted here.

Since the illumination device 500 illustrated in FIG. 25 and the illumination device 600 illustrated in FIG. 26 do not include a diffractive optical element, the diffusion range of light emitted to the illumination target surface becomes narrower than the diffusion range of the light of the illumination device according to the embodiments described so far. However, since light can be diffused to some extent also in the light scanning parts 540 and 640 and the collimating optical systems 520 and 620, the light intensity per unit area of the illumination light can be weakened as compared with direct light emitted from the light source. Therefore, even when coherent light of a laser light source or the like is used for the point light source generation part, it is possible to ensure necessary safety.

§ 8. Summary of Basic Concepts of Invention

Finally, the basic concept of the invention is summarized, and main points thereof are described. The invention provides an illumination device capable of illuminating a plurality of illumination ranges with a simple optical configuration and has various aspects as follows.

In a basic aspect of the invention, an illumination device includes a light source, a diffractive optical element that diffracts incident light and illuminates an illumination range in which at least one of a position, shape, area and direction differs according to an incident angle of the incident light, a light scanning part for scanning light from the light source in at least one direction to change the incident angle of the incident light into the diffractive optical element, and a shaping optical system for collimating the light from the light source. The light from the light source is incident on the diffractive optical element from one of the light scanning part and the shaping optical system through the other.

In one aspect of the invention, in the illumination device, the light scanning part scans the light from the light source in at least one direction and makes the light to be incident on the shaping optical system, and the shaping optical system collimates the light incident from the light scanning part and makes the light to be incident on the diffractive optical element.

In one aspect of the invention, in the illumination device, the shaping optical system collimates the light from the light source and makes the light incident on the light scanning part, and the light scanning part scans light on the diffractive optical element.

In one aspect of the invention, in the illumination device, the light scanning part periodically scans the light from the light source in at least one axial direction.

In one aspect of the invention, in the illumination device, the light scanning part periodically changes the incident angle of the parallel light incident on the diffractive optical element.

In one embodiment of the invention, in the illumination device, the diffractive optical element changes at least one of a position, shape, area, and direction of the illumination range in conjunction with the scanning of light by the light scanning part.

In one aspect of the invention, in the illumination device, the diffractive optical element moves the illumination range in a predetermined direction in conjunction with the scanning of light by the light scanning part.

In one aspect of the invention, in the illumination device, the diffractive optical element illuminates the illumination area having substantially the same area and the same shape regardless of the scanning position of light by the light scanning part.

In one aspect of the invention, the illumination device includes a light source control part that controls turning on-or-off of the light source in conjunction with the scanning of the light scanning part.

In one aspect of the invention, in the illumination device, the light source control part turns on the light source when the light scanning part is at a predetermined scanning position and turns on the light source when the light scanning part is at scanning positions other than the predetermined scanning position. When the incident angle corresponds to the predetermined scanning position, the diffractive optical element illuminates the illumination range according to the incident angle.

In one aspect of the invention, in the illumination device, the diffractive optical element can illuminate the illumination ranges at different positions according to the scanning direction of light by the light scanning part. The diffractive optical element illuminates the illumination range at an arbitrary position by performing the turning-on control of the light source by the light source control part in synchronization with the scanning direction of light by the light scanning part.

In one aspect of the invention, in the illumination device, the diffractive optical element illuminates the illumination range obtained by extending the diffraction range of the diffractive optical element according to the angle between the traveling direction of the diffracted light of the diffractive optical element and the normal direction of the surface on which the illumination range is provided.

In one aspect of the invention, in the illumination device, the diffractive optical element includes the plurality of element diffractive optical parts which illuminate the same illumination range when the incident angle of the light from the light scanning part is a predetermined angle.

In another aspect of the invention, the illumination device includes the light source, the light scanning part which scans the light from the light source in at least one direction, and the shaping optical system which illuminates the illumination range in which at least one of the position, shape, area, and direction is different according to the incident angle of the light incident from the light scanning part by collimating the light scanned by the light scanning part in at least one direction.

In still another aspect of the invention, the illumination device includes the light source, the shaping optical system which collimates the light from the light source, and the light scanning part which illuminates the illumination range in which at least one of the position, shape, area, and direction is different according to the incident angle of the light incident from the shaping optical system by scanning the light collimated by the shaping optical system in at least one direction.

In one aspect of the invention, in the illumination device, the diverging point of the light source is arranged at the front focal position of the shaping optical system.

In one aspect of the invention, in the illumination device, the diverging point of the light source is arranged at the position deviated from the front focal position of the shaping optical system.

The point light source in the illumination device according to the aspects described above may not necessarily be accurately arranged at the front focal position of the collimating optical system. When the point light source is arranged at a position slightly deviated from the front focal position of the collimating optical system, the illumination light emitted from the illumination device can be diffused light or convergent light. In the case of diffused light, the light intensity per unit area is weakened, and thus the safety is improved particularly in a case where the coherent light source is used as the light source. In the case of convergent light, the illumination range can be illuminated more clearly, and the display resolution can be improved in a case where information is displayed by the illumination device.

Hereinbefore, while the invention has been described above based on several embodiments, these embodiments are presented as examples only and are not intended to limit the scope of the invention. These embodiments can be implemented in other various forms, and various omissions, replacements and changes can be made without departing from the scope of the invention. These embodiments and modifications thereof are included in the scope and the gist of the invention and are included in the invention described in the claims and the equivalent scope thereof.

INDUSTRIAL APPLICABILITY

The illumination device according to the invention can be widely used for applications that illuminate a specific illumination area and, if necessary, move the illumination area. In particular, it is most suitable for applications in an illumination environment where the angle between the optical axis of the illumination light and the illumination target surface is small, for example, for application of illuminating the road surface of the road.

REFERENCE SIGNS LIST

10 Road surface (illumination target surface)
20 to 25 Illumination area
30 Pedestrian
40 Vehicle
100, 101 to 107 Illumination device (first embodiment)
110 Point light source
110A, 110B Apparent point light source
111, 111R, 111G, 111B Laser light source (point light source generation part)
112 Optical fiber (point light source generation part)
113 Laser module (point light source generation part)
114 Light source device (point light source generation part)
115 Condensing lens (point light source generation part)
116, 116R, 116G, 116B Diverging lens (point light source generation part)
120, 120R, 120G, 120B Collimating optical system
130, 130R, 130G, 130B Diffractive optical element
135 Hologram master plate (photosensitive medium)
138 Diffusion plate
140 Light scanning part (transmission type)
145, 145R, 145G, 145B Light scanning part (reflection type)
150, 150A, 150B Illumination area
160 Scanning control part
170 Light source control part
180 Device housing
200, 201 to 208 Illumination device (second embodiment)
210 Point light source
211, 211R, 211G, 211B Laser light source (point light source generation part)
212 Optical fiber (point light source generation part)
213 Laser module (point light source generation part)
214 Light source device (point light source generation part)
215 Condensing lens (point light source generation part)
216, 216R, 216G, 216B Diverging lens (point light source generation part)
220, 220R, 220G, 220B Collimating optical system
230, 230R, 230G, 230B Diffractive optical element
240 Light scanning part (transmission type)
245, 245R, 245G, 245B Light scanning part (reflection type)
250, 250A, 250B Illumination area
260 Scanning control part
270 Light source control part
280 Device housing
330 Diffractive optical element
350 Illumination area
430 Element diffractive optical element
431, 432 Element diffractive optical part
450 Illumination area
500 Illumination device
510 Point light source
511 Laser light source
512 Optical fiber
520 Collimating optical system
540 Light scanning part
550A, 550B Illumination area
600 Illumination device
610 Point light source
611 Laser light source
612 Optical fiber
620 Collimating optical system
640 Light scanning part
650A, 650B Illumination area
Ap Rectangular area indicating angular space distribution of diffused light from vicinity of point P
C Optical axis (central axis of illumination light)
D Distribution point on angular space distribution
dl Longitudinal direction of illumination area
dw Width direction of illumination area
F Area in thick frame
f Focal length of collimating optical system
L110 Divergent light
L110A, L110B Apparent divergent light
L114 Illumination light
L115 Refraction light L120, L120A, L120B Parallel light
L130, L130A, L130B Diffracted light
L140, L140A, L140B Scanning light
L145 Reflected light
L210 Divergent light
L214 Illumination light
L215 Refraction light
L220 Parallel light
L230 Diffracted light
L240, L240A, L240B Parallel light
L245 Reflected parallel light
L330 Diffracted light
L430 Diffracted light
L510 Divergent light
L520 Parallel light
L540 Scanned light
L610 Divergent light
L620 Parallel light
L640 Scanned parallel light
Lin Light incident on diffractive optical element
LZ Illumination zone
Np Normal made at point P on diffractive optical element
O Object light/origin of coordinate system
P Point on diffractive optical element
P1, P2 Representative point of element diffractive optical part
Q Point on illumination target surface
R Parallel reference light
r Rotation axis
X, Y, Z Each coordinate axis of three-dimensional orthogonal coordinate system
xp, yp, zp Coordinate value of point P in three-dimensional orthogonal coordinate system
xq, yq, zq Coordinate value of point Q in three-dimensional orthogonal coordinate system
θ Illumination angle to illumination target surface
θH Horizontal displacement angle
θV Vertical displacement angle

The invention claimed is:

1. An illumination device comprising:
a point light source generation part which generates a point light source;
a diffractive optical element which forms a predetermined illumination area on a predetermined illumination target surface by diffracted light generated by diffracting parallel light incident at a predetermined incident angle;
a collimating optical system which shapes divergent light from the point light source into parallel light; and
a light scanning part which scans light by emitting the incident light while changing a direction of the light,
wherein the point light source, the light scanning part, the collimating optical system, and the diffractive optical element are arranged such that the divergent light from the point light source is incident on the diffractive optical element from one of the light scanning part and the collimating optical system through another,
wherein the collimating optical system is arranged such that a front focal position of the collimating optical system coincides with a position of the point light source,
wherein the incident angle of the parallel light incident on the diffractive optical element is changed by scanning of the light scanning part, and
wherein the diffractive optical element is formed with a diffraction pattern in which at least one of a position, a shape, and an area of the illumination area formed on the predetermined illumination target surface changes according to the change of the incident angle of the parallel light.

2. The illumination device according to claim 1, wherein the divergent light from the point light source is given to the collimating optical system through the light scanning part, and the parallel light shaped by the collimating optical system is incident on the diffractive optical element, and
the direction of the light incident on the collimating optical system is changed by the scanning of the light scanning part, and the incident angle of the parallel light incident on the diffractive optical element is changed.

3. The illumination device according to claim 2, wherein the light scanning part includes a transmission type scanning body which emits light incident on a first surface from a second surface and a scanning mechanism which performs scanning while rotating the transmission type scanning body about at least one axis, and
the divergent light from the point light source is transmitted through the transmission type scanning body to be directed to the collimating optical system, and a direction of the light transmitted through the transmission type scanning body is changed in at least one direction by the scanning of the scanning mechanism.

4. The illumination device according to claim 2, wherein the light scanning part includes a reflection type scanning body having a reflection surface which reflects and emits incident light and a scanning mechanism which performs scanning while rotating the reflection type scanning body about at least one axis, and
the divergent light from the point light source is reflected by the reflection type scanning body to be directed to the collimating optical system, and a direction of the light reflected by the reflection type scanning body is changed in at least one direction by the scanning of the scanning mechanism.

5. The illumination device according to claim 1, wherein the divergent light from the point light source is given to the light scanning part through the collimating optical system, and the parallel light shaped by the collimating optical system is incident on the light scanning part, and
the incident angle of parallel light incident on the diffractive optical element is changed by the scanning of the light scanning part.

6. The illumination device according to claim 5, wherein the light scanning part includes a transmission type scanning body which emits light incident on a first surface from a second surface and a scanning mechanism which performs scanning while rotating the transmission type scanning body about at least one axis, and
the parallel light from the collimating optical system is transmitted through the transmission type scanning body to be directed to the diffractive optical element, and a direction of the parallel light transmitted through the transmission type scanning body is changed in at least one direction by the scanning of the scanning mechanism.

7. The illumination device according to claim 5, wherein a light scanning part includes a reflection type scanning body having a reflection surface which reflects and emits incident light and a scanning mechanism which performs scanning while rotating the reflection type scanning body about at least one axis, and
the parallel light from the collimating optical system is reflected by the reflection type scanning body to be directed to the diffractive optical element, and a direction of the parallel light reflected by the reflection type scanning body is changed in at least one direction by the scanning of the scanning mechanism.

8. The illumination device according to claim 5, wherein the light scanning part performs periodic scanning in at least one direction, and the incident angle of the parallel light incident on the diffractive optical element changes periodically.

9. The illumination device according to claim 5, wherein the diffractive optical element is formed with a diffraction pattern of which a diffraction direction changes according to the change of the incident angle of the parallel light.

10. The illumination device according to claim 5, wherein the diffractive optical element is configured by a hologram element which forms a reproduced image on the predetermined illumination target surface by the diffracted light, and the illumination area is formed by the reproduced image.

11. The illumination device according to claim 10, wherein an interference fringe of object light from a diffusion plate of a predetermined shape and parallel reference light is recorded in the hologram element, and
wherein when the light scanning part scans the parallel light incident on the hologram element, scanning is performed to increase or decrease a reference angle with an incident angle of the parallel reference light as the reference angle.

12. The illumination device according to claim 11, wherein the hologram element is a CGH in which the interference fringe obtained by computer calculation is recorded.

13. The illumination device according to claim 11, wherein the diffractive optical element includes a plurality of element diffractive optical parts, and
wherein each of the element diffractive optical parts forms the same illumination area on the illumination target surface on the basis of parallel incident light incident at a common reference angle.

14. The illumination device according to claim 13, wherein the diffractive optical element includes the plurality of element diffractive optical parts arranged in a two-dimensional matrix on a predetermined arrangement plane.

15. The illumination device according to claim 5, wherein the light scanning part has a function of two-dimensionally scanning light by emitting the light while changing a direction of the incident light with respect to two orthogonal directions, and a position of an illumination area formed on the illumination target surface is changed two-dimensionally.

16. The illumination device according to claim 5, wherein when an aggregate area of a plurality of different illumination areas formed on the illumination target surface is called an illumination zone, the light scanning part performs scanning at a speed where the illumination zone is visually recognized as a single area by a human eye.

17. The illumination device according to claim 5, further comprising:
a scanning control part which controls the scanning of the light scanning part; and
a light source control part which controls the turning on-or-off of the point light source generation part,
wherein the turning on-or-off of the point light source is controlled by the light source control part in conjunction with the scan control by the scanning control part.

18. The illumination device according to claim 17, wherein the scanning control part performs scan control such that scanning is performed periodically, and
wherein the light source control part performs control of turning on at a specific scanning position and turning off at other scanning positions so as to illuminate only the illumination area corresponding to the specific scanning position.

19. The illumination device according to claim 5, wherein the point light source generation part includes a laser light source and an optical fiber which guides laser light generated by the laser light source from a root end to a tip end, and the point light source is generated at the tip end of the optical fiber.

20. The illumination device according to claim 5, wherein the point light source generation part includes a light source device and a condensing lens which condenses light from the light source device, and the point light source is generated at a condensing position of the condensing lens.

21. The illumination device according to claim 5, wherein the point light source generation part includes a laser light source and a diverging lens which diverges laser light generated by the laser light source, and the point light source is generated at a position of the diverging lens.

22. A color illumination device comprising:
three sets of illumination devices according to claim 5,
wherein a point light source generation part of a first illumination device generates a red point light source, a point light source generation part of a second illumination device generates a green point light source, and a point light source generation part of a third illumination device generates a blue point light source,
wherein a diffractive optical element of the first illumination device forms a red illumination area, a diffractive optical element of the second illumination device forms a green illumination area, and a diffractive optical element of the third illumination device forms a blue illumination area, and
wherein a color illumination area of a predetermined color is formed in an overlapping portion of the red illumination area, the green illumination area, and the blue illumination area.

23. The illumination device according to claim 5, further comprising an attaching part for attachment to a vehicle,
wherein the illumination target surface is set on a road surface, and the road surface is illuminated from the vehicle.

* * * * *